United States Patent [19]

Yamaoka et al.

[11] 4,110,898
[45] Sep. 5, 1978

[54] MACHINE TOOL

[75] Inventors: Kojiro Yamaoka, Nishinomiya; Toshihide Mihara; Akira Tanaka, both of Amagasaki, all of Japan

[73] Assignee: Kanzaki Kokyukoki Mfg. Co., Ltd., Amagasaki, Japan

[21] Appl. No.: 773,198

[22] Filed: Mar. 1, 1977

[30] Foreign Application Priority Data

| Mar. 2, 1976 | [JP] | Japan | 51-25025[U] |
| Mar. 2, 1976 | [JP] | Japan | 51-25026[U] |
| Mar. 9, 1976 | [JP] | Japan | 51-25749 |
| Dec. 21, 1976 | [JP] | Japan | 51-154447 |
| Dec. 28, 1976 | [JP] | Japan | 52-177136[U] |
| Dec. 28, 1976 | [JP] | Japan | 52-177137[U] |

[51] Int. Cl.$^2$ .................................. B23Q 3/157
[52] U.S. Cl. ................... 29/568; 29/563; 214/1 BB
[58] Field of Search ............ 29/568, 33 D, 563; 214/1 BB, 1 BC, 1 BD, 16.1 CE, 16.4 R, 75 R

[56] References Cited

U.S. PATENT DOCUMENTS

| 3,049,247 | 8/1962 | Lemelson | 214/16.4 R |
| 3,054,333 | 9/1962 | Brainard et al. | 29/33 P X |
| 3,286,595 | 11/1966 | Wollenhaupt | 29/568 X |
| 3,343,244 | 9/1967 | Baublys, et al. | 29/33 P X |
| 3,789,473 | 2/1974 | Pagella et al. | 29/568 |

Primary Examiner—Gil Weidenfeld

[57] ABSTRACT

A machine tool comprising one or plural storage magazines which are mounted along the vertical direction rotatably around a vertical axis on an upstanding support frame structure at a side of working station. Each of the magazines stores at the periphery thereof a plurality of spindle heads, workpiece supporting jigs or tool supporting heads which are alternatively set one by one to a set position at the working station for operation on workpieces. Alternative setting of such heads or jigs is achieved by a selective rotation of each magazine and by a selective lifting and lowering of the head or jig between the set position and a store position just above such set position. Floor space required for storing and exchanging the heads or jigs is largely saved. A particular exchanging device for exchanging heads or jigs stored by the magazines for another heads or jigs is provided which greatly enlarges processings possibly carried out at the working station.

18 Claims, 25 Drawing Figures

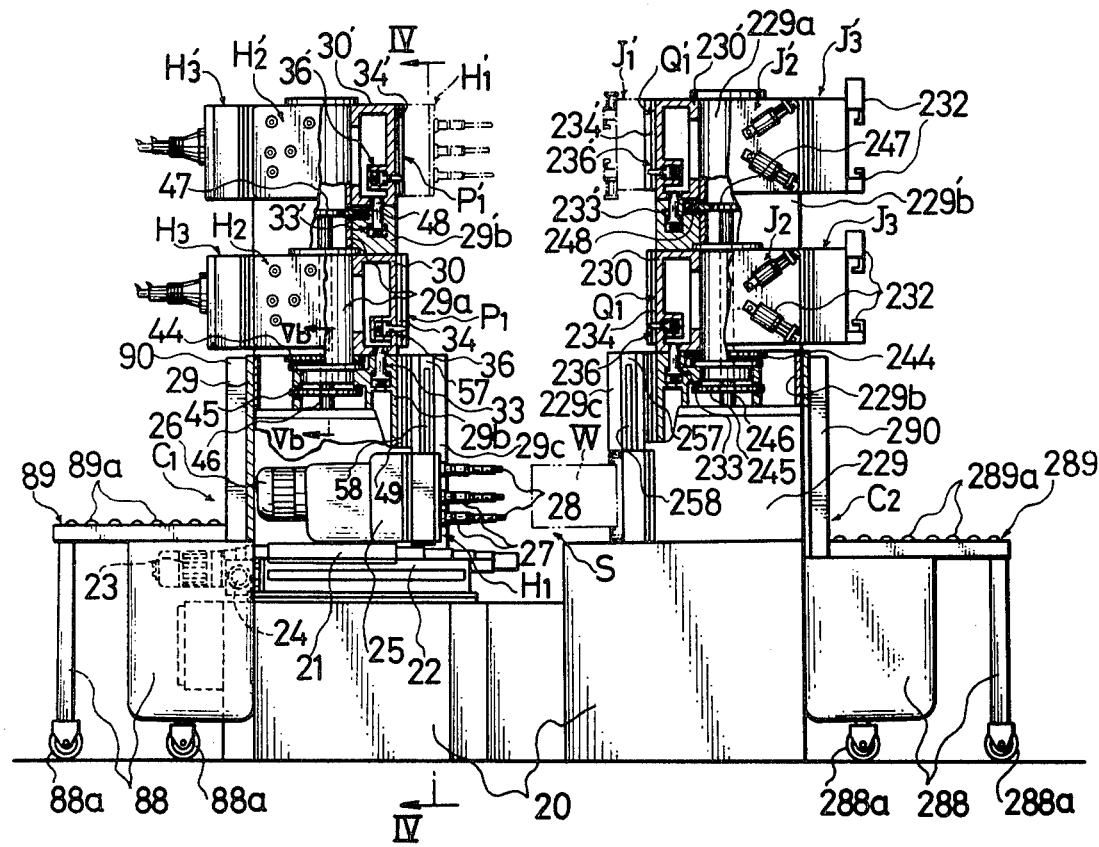

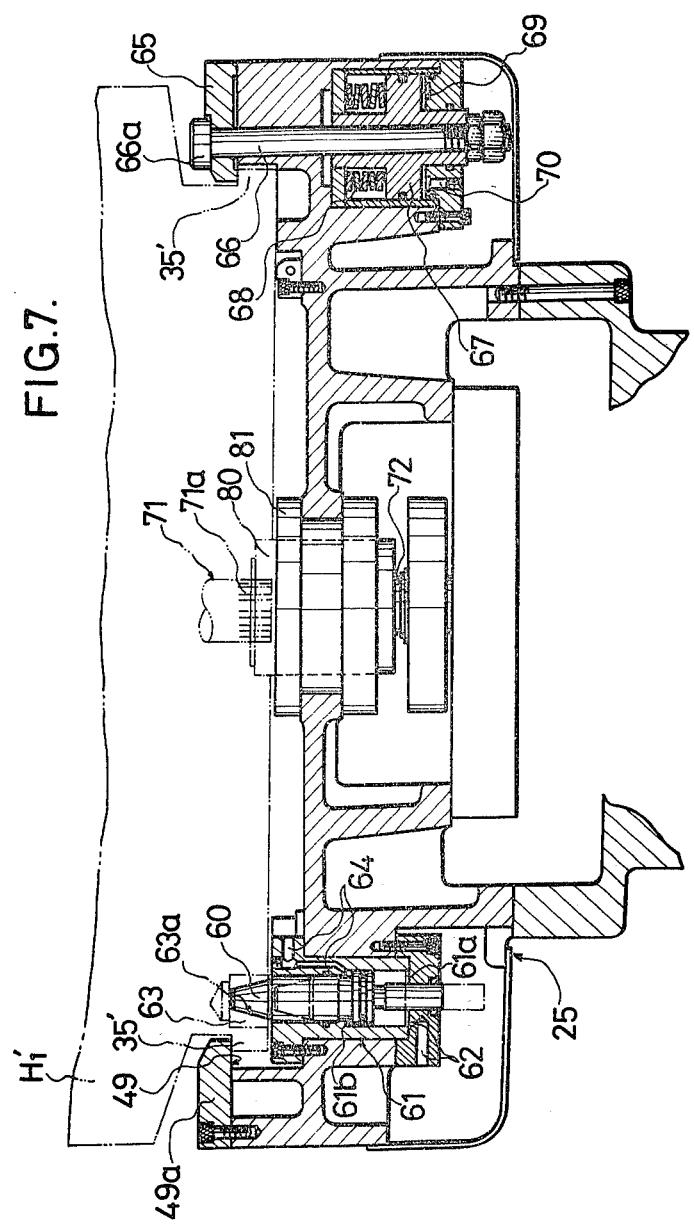

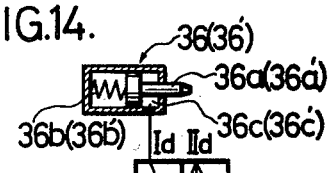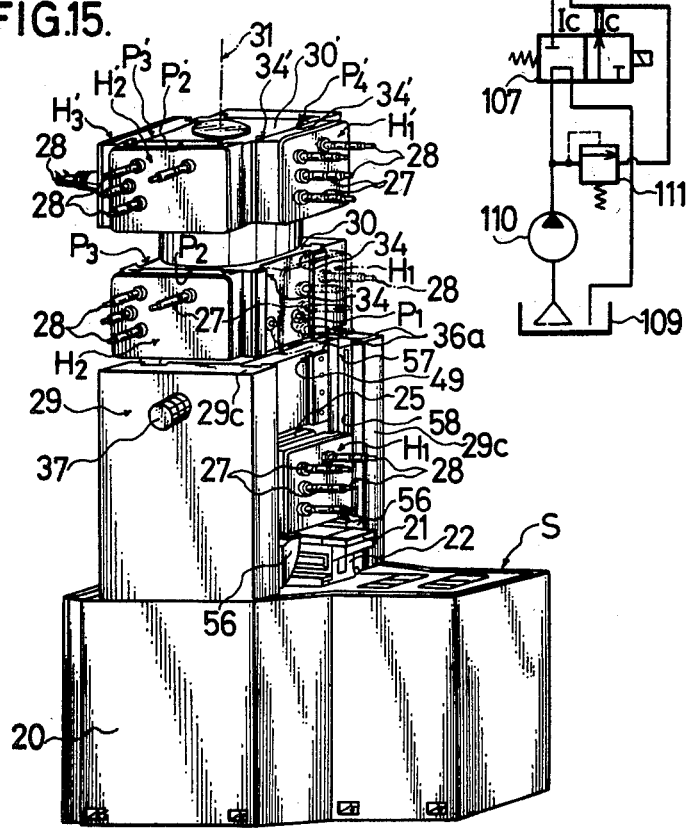

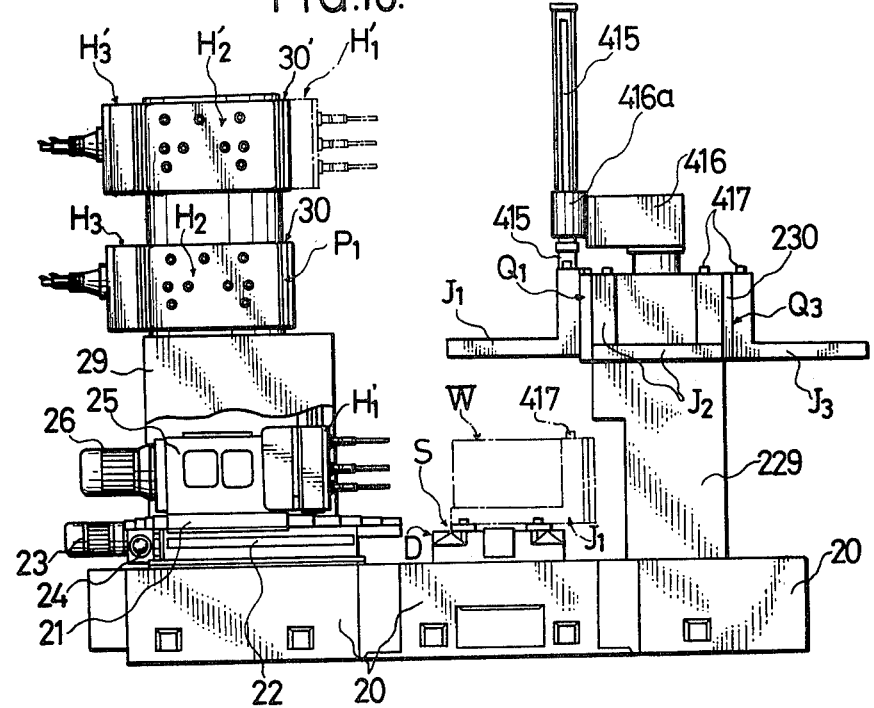

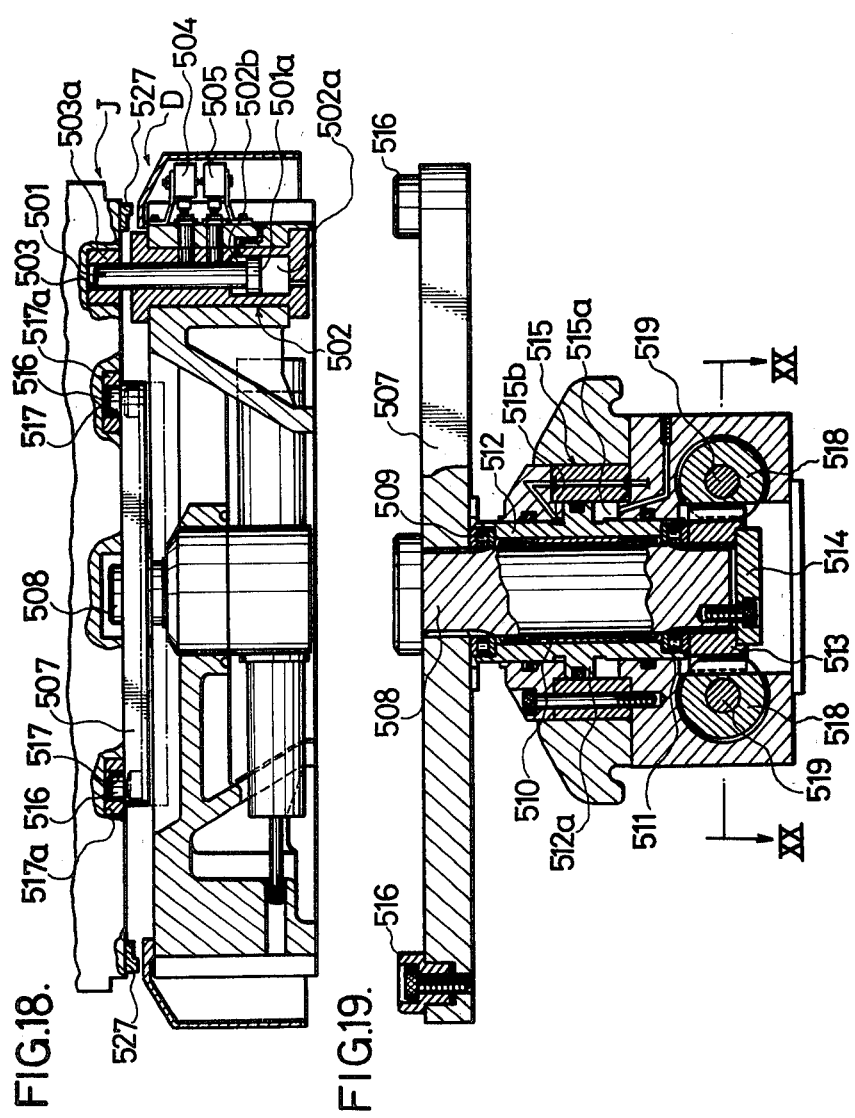

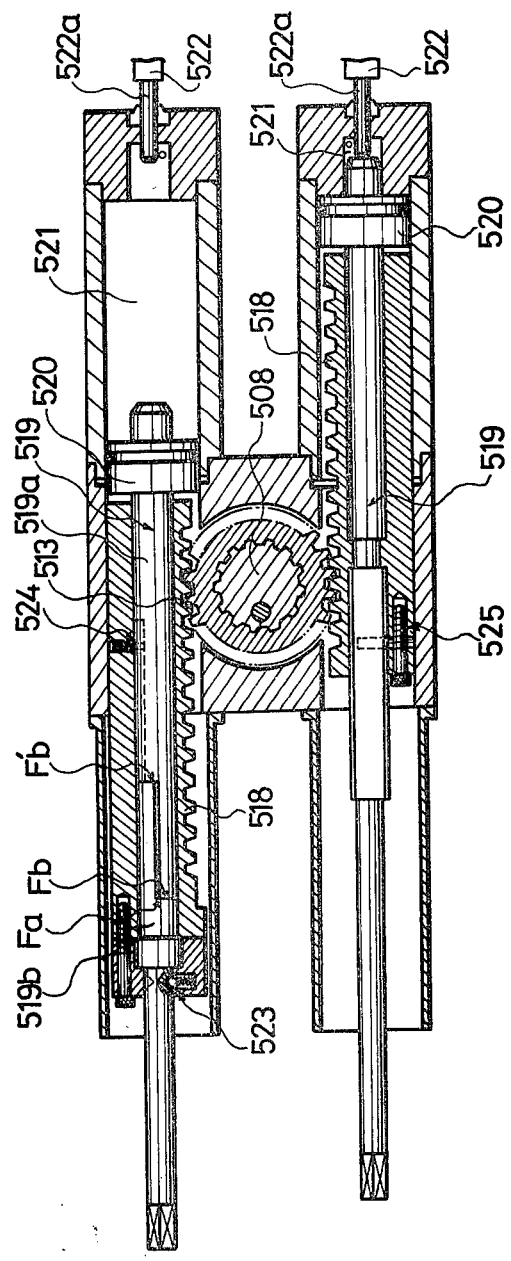

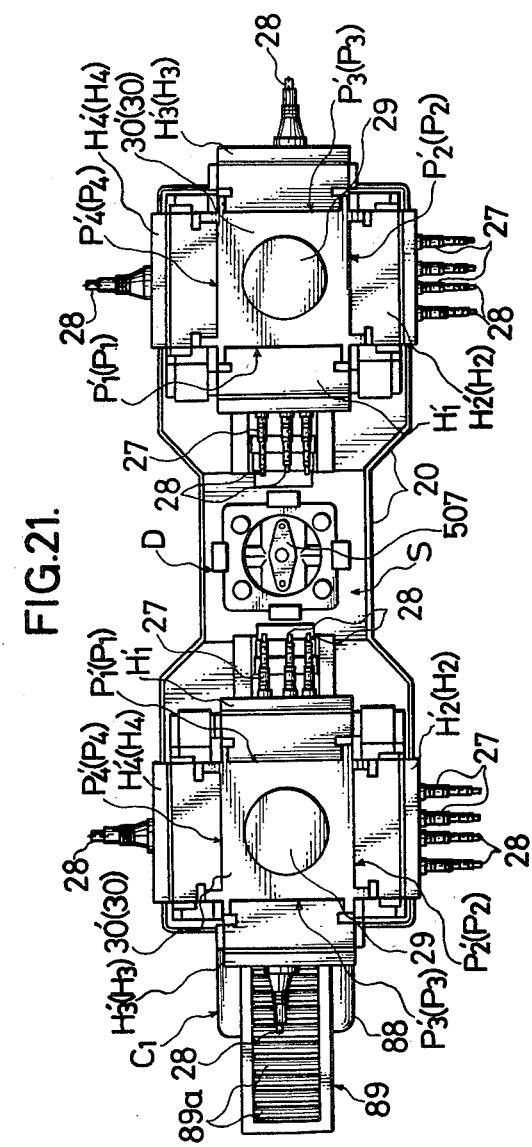

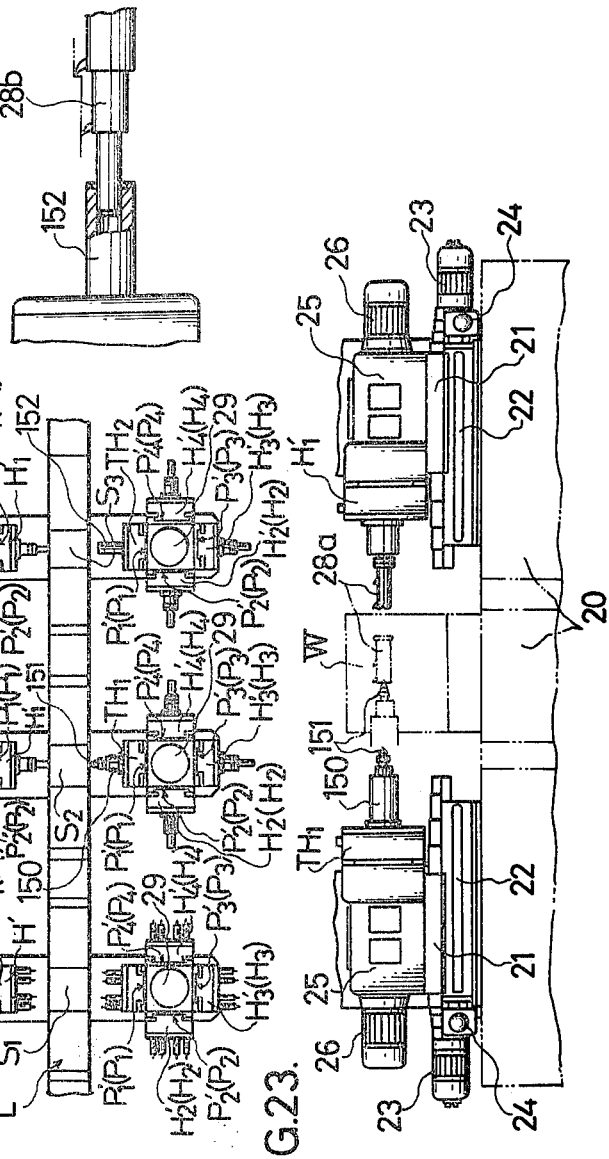

MACHINE TOOL

BACKGROUND OF THE INVENTION

This invention relates to a novel and improved machine tool, and more particularly to a novel machine tool of the type comprising a plurality of exchangeable machine members which are settable one by one alternatively to a set position at a working station for operation on a workpiece in accordance with sort and size of such workpiece, sort of processing to be applied to such workpiece, sizing of such processing and the like. The exchangeable machine members may be spindle heads each having single or multiple spindles and tool or tools connected to such spindle or spindles, workpiece supporting jigs each having workpiece clamping means or tool supporting heads each having tool supporting means such as boring bar support.

It is often required in manufacturing various machine components and parts such as cylinder blocks for vehicle engines that a workpiece is applied at various portions thereof by various processings such as drilling, tapping, boring and the like. It is also required in many machine manufacturing fields for the purpose of saving investment cost that various workpieces of different sorts and/or sizes are applied by various processings different in sort and/or sizing by using a common machine tool or a series of common machine tools. In many cases, such processings are carried out by employing so-called transfer machine in which working stations are provided intermittently along a transfer line and workpieces transferred along such transfer line are successively applied by successive processings at the working stations by means of machine tools arranged at one or both sides of such working stations.

In carrying out such processings, tools of different sorts and/or having different sizing of processing are, of course, used selectively in accordance with sort and size of workpiece, sort of processing to be applied, sizing of such processings. Consequently, when different processings are to be carried out by using common machine or machines, tool itself of such machine has to be exchanged in every different processings. Further, tool supporting means such as boring bar support and/or workpiece supporting jig may have to be exchanged.

As to tools of machine tool, there have been proposed many machine tools of the type in which tool storage magazine storing a plurality of tools is provided from which a required tool is selectively derived and set to a position operable on a workpiece by means of tool changing device. However, in cases when tools are individually exchanged, exchange of plural tools which are driven by plural spindles of a machine tool so as to apply plural processings to a workpiece or workpieces at a time is much time-consuming. As to jigs, there have merely been known storing and changing mechanisms of the type in which turret or similar movable carrier for jigs is provided at a level of working station and such turret or carrier is selectively driven to move so that a required jig is located to a position operable on a workpiece so as to support the same for processing. In such mechanisms, number of exchangeable jigs is limited so far as the turret or carrier of such low level is not one such that it requires too large floor space for equipment.

When a plurality of tools and/or jigs are to be provided in a machine tool so that they are settable alternatively to a set position at a working station for operation on a workpiece, there is necessarily a problem how tools and/or jigs as possibly large in number are included in such machine tool in a fashion such that floor space as possibly small in area is required for storing and exchanging such tools and/or jigs and such that quick exchanging of such tools and/or jigs is permited. Exchangeable tools and/or jigs large in number enlarges processings possibly carried out by such machine tool, and quick exchanging of such tools and/or jigs promotes efficiency of processing as a whole. Saving of required floor space makes it easy and optional to arrange accessories of such machine tool such as chip conveyor, coveyor for workpieces and the like. Such saving of floor space required for a plurality of exchangeable tools and/or jigs further shortens transfer line in a transfer machine.

Accordingly, a primary object of the present invention is to provide a novel machine tool in which a plurality of exchangeable machine members are included in a fashion such that floor space required for storing and exchanging such exchangeable machine members is largely saved and such that such machine members are alternatively settable to a set position for operation on a workpiece in a time-saving manner.

Another object of the present invention is to provide a novel machine tool of the type comprising a plurality of exchangeable machine members in which such exchangeable machine members stored in the machine may further be exchanged selectively for another exchangeable machine members for enlarging processings possibly carried out by such machine with ease and in a timesaving manner.

Still another object of the present invention is to provide a novel machine tool in which plural tools employed for plural processings at a time may be set to a set position operable on a workpiece or workpieces at a same time so that exchanging of a set of tools used at a time is quickly achieved.

A further object of the present invention is to provide a novel machine tool in which a plurality of exchangeable workpiece supporting jigs having workpiece clamping means are included with permitting a rapid exchange of such jigs in a fashion such that floor space required for such plural jigs is largely saved, whereby the machine permits without trouble to carry out different processings which require different jigs.

A still further object of the present invention is to provide a novel and improved machine tool in which a plurality of exchangeable spindle heads having spindles and tools connected thereto and a plurality of exchangeable workpiece supporting jigs are included in a fashion such that both of such spindle heads and jigs may be exchanged for different processings at a same time so that efficiency of processings is largely promoted as a whole.

A specific object of the present invention is to provide a novel machine tool in which a plurality of exchangeable workpiece supporting jigs are included in a floor saved fashion and in which workpiece supported by a jig having been set at a working station may be indexed for processing with ease and quickly together with such jig.

A further specific object of the present invention is to provide a machine tool of the type comprising a plurality of exchangeable machine members in which cares are taken for safety of the machine itself and of operators.

SUMMARY OF THE INVENTION

In general, the machine tool according to the present invention comprises an upstanding support frame structure at a side of working station. The support frame structure mounts at least one magazine at above such side of working station in a fashion such that the magazine may be rotated about a vertical axis. The magazine is formed at the periphery thereof and intermittently along the peripheral direction thereof with a plurality of storage rooms at which spindle heads having spindles and tools, workpiece supporting jigs having workpiece clamping means or tool supporting heads having tool support means such as boring bar support are to be stored by the magazine. Such spindle heads, workpiece supporting jigs or tool supporting heads, which may be termed as "exchangeable machine members", may alternatively be located at a store position just above a set position at the working station by a selective rotation of the magazine. For the purpose of setting such exchangeable machine members alternatively to the set position, there are provided in the machine drive means for selectively rotating the magazine and another drive means or vertical conveyor means for lifting and lowering selectively an exchangeable machine member between the set position and a store position just above such set position. A plurality of exchangeable machine members may be stored in the machine tool itself in a fashion such that floor space required for storing and exchanging such members is largely saved, because such exchangeable members are stored in an upper space at around the upstanding support frame structure and because such members are conveyed along the vertical direction for exchanging the same. When the exchangeable machine members are spindle heads, the upstanding frame structure is arranged at a location, where drive unit having spindle drive motor is provided, in a fashion such that the frame structure extends above the drive unit so that such unit is located within the frame structure. In this case, no additional floor space is substantially required for storing the plurality of spindle heads. Alternative setting of the exchangeable machine members made by a selective rotation of the magazine and by a selective lifting and lowering of such member may be achieved quickly and under the control by a numerical control device. When the exchangeable machine members are spindle heads, there are provided to the drive unit head clamp means for clamping the head to such drive unit and connecting means for operatively connecting the head to the drive unit so that spindles of such head may be driven to rotate by the drive unit or spindle drive motor of such unit. Operation of such head clamp means and connecting means may also be controlled by a numerical control device.

It is to be noted that magazines for storing the exchangeable machine members may be increased in number without any additional floor space by arranging such magazines along the vertical direction on the upstanding support frame structure. In another aspect of the present invention, a plurality of the magazines are provided by arranging the same in the just mentioned fashion. In this case, one of the storage rooms of each of the magazines except for the uppermost magazine is empty of the exchangeable machine member for providing path of vertical conveying of the machine member. By this, number of processings possibly carried out by a machine tool is much enlarged.

For enlarging further such number of processings possibly carried out by a machine tool, an exchanging device is provided which comprises transfer path means for transferring an exchangeable machine member to and out of a position just below a storage room of a specific phase of each magazine and drive or vertical conveyor means for lifting and lowering such machine member between the said position and a storage room just above such position. Because each of the storage rooms or exchangeable machine members may be located to such specific phase by a selective rotation of the magazine, the exchangeable machine members stored by the magazine or magazines may be exchanged selectively for another exchangeable machine members by using such exchanging device. The exchanging device is preferably mounted on a truck means. By this, such exchanging device may be made into a common one for plural machines or may be appended to the machine only when such exchanging device is required.

In a further aspect of the present invention, a pair of the upstanding support frame structures are provided at opposite sides of working station. At least one magazine for storing spindle heads is mounted on one of such pair of support frame structures. On the support frame structure of another side is mounted at least one magazine which may store spindle heads for applying processing to workpiece at the working station also from such another side, workpiece supporting jigs for alternatively supporting workpieces which are alternatively supplied to the working station, or tool supporting heads having tool supporting means which cooperate with tools of the spindle heads of the opposite side for precise or fine processing of workpiece.

In a specific aspect of the present invention, there is provided at working station support table means for supporting a pallet carrying workpiece or a jig supporting workpiece which table means includes therein indexing means for a quick indexing of such pallet or jig or workpiece carried by such pallet or jig, so that the table means promotes, in cooperation with the mechanism detailed hereinbefore, efficiency of processings.

BRIEF DESCRIPTION OF THE DRAWINGS

The present invention and its attendant advantages will become more readily apparent as the specification is considered in conjunction with the accompanying drawings, in which:

FIG. 5a is an enlarged view of a part of FIG. 1, showing magazine clamping means and head clamp means employed in the machine tool shown in FIG. 1;

FIG. 7 is a sectional plane view, partially omitted, of the drive unit shown in FIG. 6;

FIG. 14 is a schematic illustration of fluid supply system for head clamp means employed in the machine tool shown in FIG. 1;

FIG. 15 is a perspective view similar to FIG. 3 but showing a variation of the left half of the machine tool shown in FIG. 1;

FIG. 16 is a side elevational view, partially cut away, of another embodiment of the machine tool according to the present invention;

FIG. 18 is a vertical sectional view of the jig supporting table means shown in FIG. 17 taken along line XVIII—XVIII of FIG. 17;

FIG. 19 is an enlarged vertical sectional view of a part of the jig supporting table means shown in FIGS. 17 and 18;

FIG. 20 is a sectional plane view taken along line XX—XX of FIG. 19;

FIG. 21 is a plane view of a still another embodiment of the machine tool according to the present invention;

FIG. 22 is a plane view showing an example of the use of the machine tool according to the present invention in a transfer machine;

FIG. 23 is an enlarged side elevational view, partially cut away, of a part of the transfer machine shown in FIG. 22, showing a use of a tool supporting head employed in such transfer machine; and FIG. 24 is an enlarged side elevational view, partially in section, showing a use of another tool supporting head employed in the transfer machine shown in FIG. 22.

DESCRIPTION OF PREFERRED EMBODIMENTS

Figure 1:
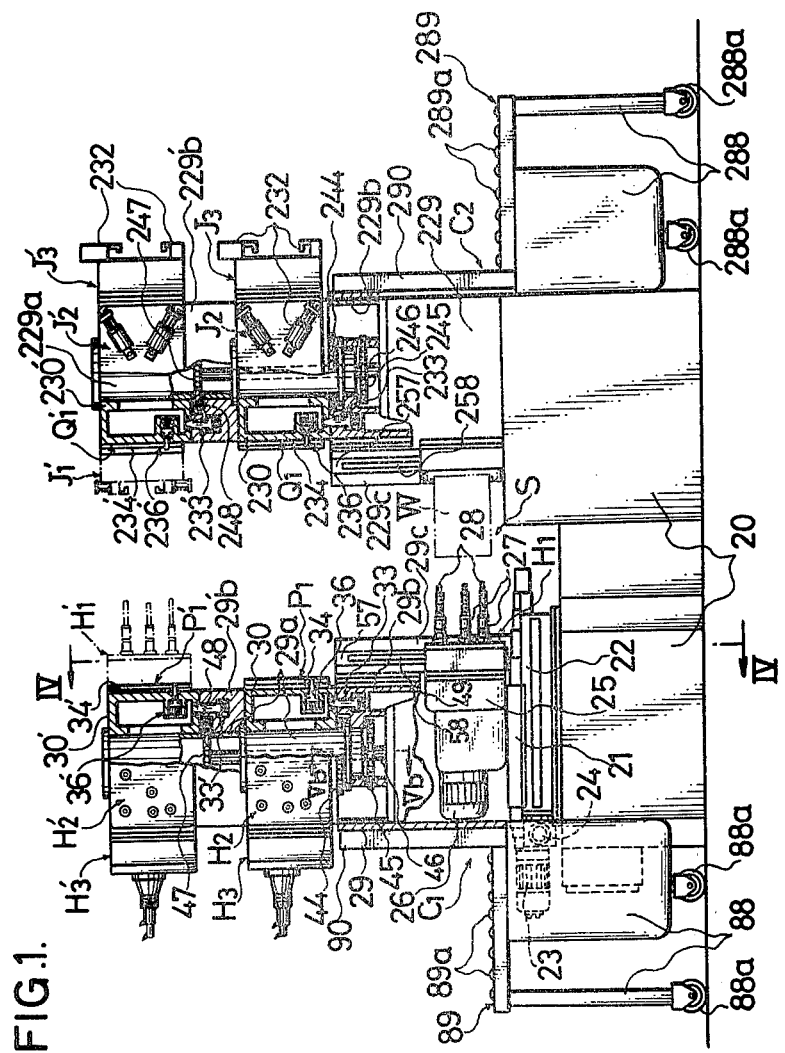
FIG. 1 is a side elevational view, partially cut away and partially in section, of an embodiment of the machine tool according to the present invention.
Figure 2:
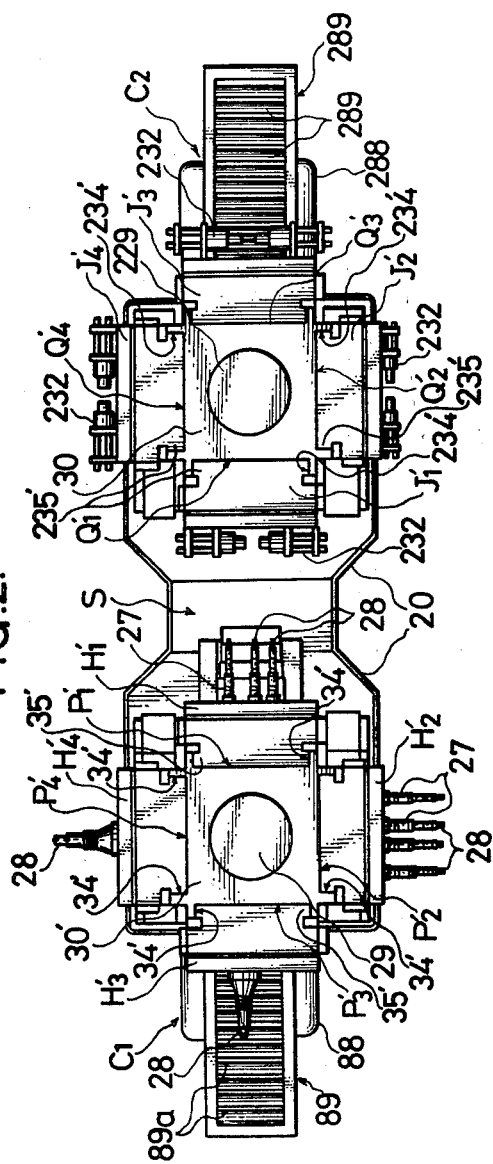
FIG. 2 is a plan view of the machine tool shown in FIG. 1.

Referring now to the drawings in which like numerals designate like parts throughout the several views thereof, there is shown a preferred embodiment of the machine tool according to the present invention in FIGS. 1 to 14. As shown in FIGS. 1 and 2, the machine tool includes a bed 20 fixedly mounted on the floor. The bed 20 has at the upper face thereof a working station S at which processing is applied to a workpiece W. At one side of the working station S is arranged slidably toward and away from such station a slide table 21 which is mounted on the bed 20 through a guide table 22 fixedly mounted on the bed. The slide table 21 is driven to slide by an electric motor 23 for rapidly advancing and retreating such table 21 and by another electric motor 24 for slowly advancing such table 21 through means which may be structured in any known fashion. On the slide table 21 is fixedly mounted a drive unit 25 having a spindle drive motor 26 in a fashion such that the unit 25 is faced to the working station S. In the state shown, the drive unit 25 carried at the front face thereof a spindle head $H_1'$ having multiple spindles 27 and tools 28 connected respectively to such spindles. The spindles 27, and therefore the tools 28, are driven to rotate by the spindle drive motor 26. When processing is to be applied to the workpiece W, the drive unit 25 is advanced together with the slide table 21 rapidly by the motor 23 so that the tools 28 are located at a position just before the workpiece. The drive unit 25 is then advanced together with the slide table slowly by the motor 24 so that the tools 28 are fed to the workpiece, whereby processing is applied to the workpiece by the tools 28 which are driven to rotate by the drive motor 26 through the unit 25 and spindles 27. After such processing, the drive unit 25 is retreated together with the slide table 21 rapidly by the motor 23 so that the tools 28 are located at a position shown.

Figure 3:
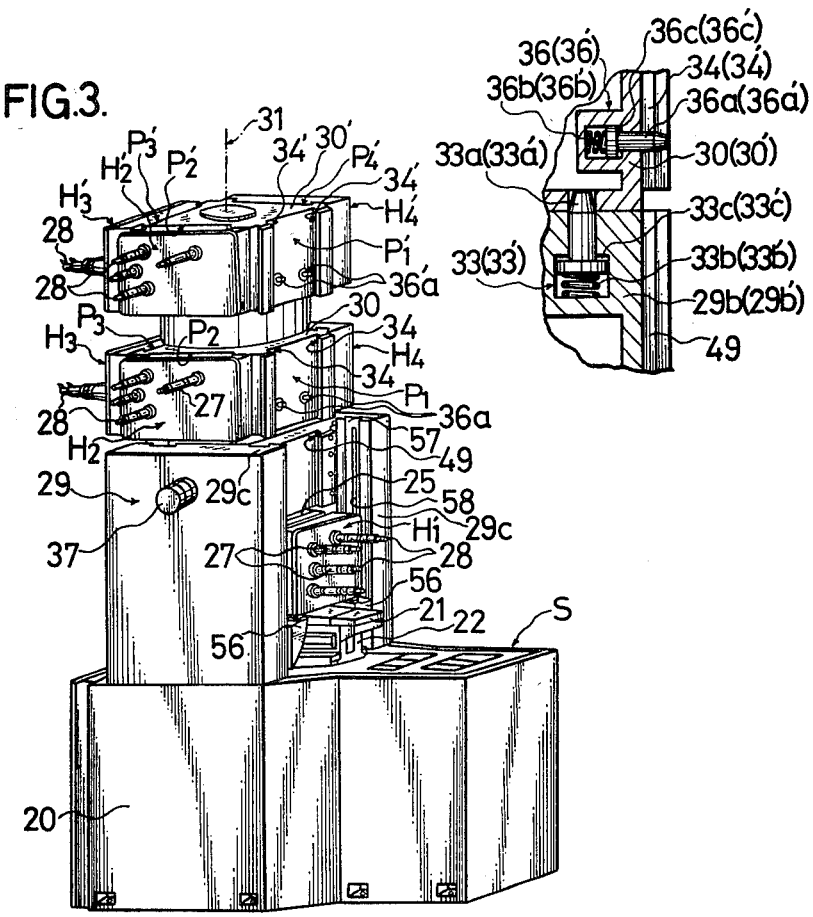
FIG. 3 is a perspective view of the left half of the machine tool shown in FIG. 1.

As also shown in FIGS. 1 and 2 and as best shown in FIG. 3, the machine tool comprises at one side of the working station S an upstanding support frame structure 29 which is installed on the bed 20 so that the structure 29 extends above the drive unit 25. The drive unit 25 is located within the frame structure 29. On such support frame structure 29 are mounted lower and upper storage magazines 30 and 30' which are apart from each other by an interval. The magazines 30 and 30' are rotatably mounted on the structure 29 so that they may be rotated independently from each other around a vertical axis 31 of the frame structure 29 (see FIG. 3). As will be detailed later, each of the magazines 30 and 30' is formed at the peripery thereof and intermittently along the peripheral direction thereof with a plurality of or four head storage rooms $P_1$, $P_2$, $P_3$, $P_4$ and $P_1'$, $P_2'$, $P_3'$, $P_4'$. The lower magazine 30 stores at the head storage rooms $P_2$, $P_3$ and $P_4$ three spindle heads $H_2$, $H_3$ and $H_4$ each having spindles 27 and tools 28 connected to such spindles and the upper magazine 30' stores at the head storage rooms $P_1'$, $P_2'$, $P_3'$ and $P_4'$ four spindle heads $H_1'$, $H_2'$, $H_3'$ and $H_4'$ each having spindles 27 and tools 28 connected to such spindles one of which spindle heads, namely spindle head $H_1'$, is now lowered to a position in front of the drive unit 25 and is carried by such unit. These spindle heads H and H' may be set one by one alternatively to a set position, at which the spindle head $H_1'$ is now set, for operation on a workpiece, as will be detailed later.

The machine tool shown further comprises another upstanding support frame structure 229 which is installed on the bed 20 at opposite side of the working station S, as also shown in FIGS. 1 and 2. On this frame structure 229 are mounted a pair of interspaced lower and upper jig storage magazines 230 and 230' so that they are rotatable independently from each other around a vertical axis, as is the case of the mentioned magazines 30 and 30'. As will be detailed later, each of the magazines 230 and 230' is formed at the periphery thereof and intermittently along the peripheral direction thereof with a plurality of or four jig storage rooms $Q_1$, $Q_2$, $Q_3$, $Q_4$ and $Q_1'$, $Q_2'$, $Q_3'$, $Q_4'$. The lower magazine 230 stores at the jig storage rooms $Q_2$, $Q_3$ and $Q_4$ three workpiece supporting jigs $J_2$, $J_3$ and $J_4$ each having workpiece clamping means 232, and the upper magazine 230' stores at the jig storage rooms $Q_1'$, $Q_2'$, $Q_3'$ and $Q_4'$ four workpiece supporting jigs $J_1'$, $J_2'$, $J_3'$ and $J_4'$ each having workpiece clamping means 232. These workpiece supporting jigs J and J' may be set one by one alternatively to a set position at the working station S for operation on a workpiece, as will be detailed later. In the state shown, the workpiece supporting jig $J_1'$ is now set at such set position so that the jig $J_1'$ now supports the workpiece W by clamping such workpiece by means of clamping means 232 thereof.

Further, as also shown in FIGS. 1 and 2, the machine tool of this embodiment is provided with a spindle head exchanging device $C_1$ for exchanging selectively the spindle heads H and H' stored by the magazines 30 and 30' for another spindle heads at a side of the upstanding support frame structure 29 and also with a jig exchanging device $C_2$ for exchanging selectively the workpiece supporting jigs J and J' stored by the magazines 230 and 230' for another workpiece supporting jigs at a side of the upstanding support frame structure 229. Such exchanging devices $C_1$ and $C_2$ will fully be detailed later.

The plurality of spindle heads H and H', which may have various tools, such as drilling, tapping or boring tolls or elements, of various sizes are stored by the lower and upper magazines 30 and 30' in a fashion detailed hereinafter. As shown in FIGS. 1 to 4, the upstanding support frame structure 29 has a vertical cylindrical portion 29a at the center and interspaced lower and upper housing portions 29b and 29b' at around the cylindrical portion 29a. The lower head storage magazine 30 is rotatably arranged around the cylindrical portion 29a at between the lower and upper housing portions 29b and 29b', and the upper head storage magazine 30' is rotatably arranged around the cylindrical portion 29a at on the upper housing portion 29b'. As shown in FIGS. 1 and 5a, there are provided magazine clamp means 33 and 33' having clamp pins 33a and 33a' which are projected upwardly from housing portions 29b and 29b' by means of compression springs 33b and 33b', respectively, so that the pins 33a and 33a' are inserted at the top portions thereof into corresponding engaging bores formed to the bottom of the magazines 30 and 30' whereby magazines are clamped not rotatably to the support frame structure 29. With such magazine clamp means 33 and 33' are associated fluid operated cylinders the pistons of which are formed by the clamp pins 33a and 33a', respectively. The pistons or pins 33a and 33a' are retreated downwardly by pressure fluid selectively supplied into fluid chambers 33c and 33c' of such cylinders so that clamping of the magazines 30 and 30' may selectively be released, respectively. As shown in FIGS. 1 to 4, each of the head storage rooms P and P' of the magazines 30 and 30' is provided with a pair of vertically extending guide grooves 34 and 34' which cooperate with vertical ledges 35 and 35' provided to each of the spindle heads H and H' at the rear portion and at both sides. The spindle heads H and H' are stored by the magazines 30 and 30' at the storage rooms P and P' with being supported at both sides by the grooves 34 and 34' receiving the ledges 35 and 35' of the heads, respectively. Vertical or downward getting-away of each spindle head is prevented by head clamp means 36 and 36' (FIGS. 1 and 5a) provided to each of the head storage rooms P and P' of the magazines 30 and 30'. Each of such head clamp means 36 and 36' has a pair of clamp pins 36a and 36a' which are projected from the head storage magazine outwardly toward the spindle head by means of compression springs 36b and 36b' so that the clamp pins are inserted into corresponding engaging bores formed to the rear face of the spindle head whereby such spindle head is clamped to the magazine carrying such head. With such head clamp means 36 and 36' are associated fluid operated cylinders the pistons of which are formed by the clamp pins 36a and 36a', respectively. The pistons or clamp pins 36a and 36a' are retreated into the magazines 30 and 30' by pressure fluid selectively supplied into fluid chambers 36c and 36c' of such cylinders so that clamping of the spindle heads H and H' may selectively be released, respectively.

The plurality of spindle heads H and H' may be set to the set position in front of the drive unit 25 by a selective rotation of each head storage magazine and by a selective conveyance of each spindle head between a store position just above the set position and such set position.

Figure 5B:
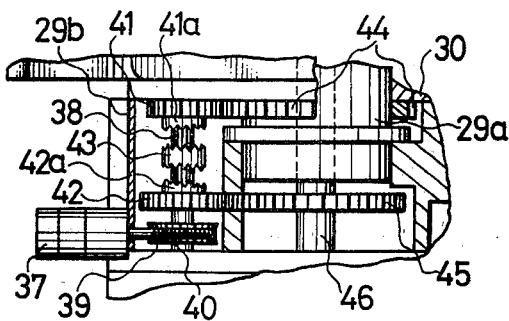
FIG. 5b is an enlarged vertical sectional view taken along line $V_b$—$V_b$ of FIG. 1 showing a part of magazine drive means employed in the machine tool shown in FIG. 1.

For the purpose of selectively rotating the lower and upper head storage magazines 30 and 30', a motor 37 is provided which is fixedly arranged on a side face of the upstanding support frame structure 29 of the lower housing portion 29b thereof. Within the housing portion 29b is arranged a rotatably mounted vertical shaft 38 which fixedly mounts a worm wheel 39 which in turn is meshed with a worm 40 formed to output shaft of the motor 37, as shown in FIG. 5b. On the shaft 38 are rotatably mounted a pair of gears 41 and 42 having claws 41a and 42a, respectively. A shiftable member 43 having claws at both ends is slidably but not rotatably mounted on the shaft 38 at between the gears 41 and 42 so that a pair of claw clutches are formed by the claws 41a and 42a and claws of the member 43. Consequently, the upper gear 41 may be driven to rotate by the motor 37 when the shiftable member 43 is shifted upwardly to cause engagement of the upper clutch or engagement between claws 41a and upper claws of the member 43, whereas the lower gear 42 may be driven to rotate by the motor 37 when the shiftable member 43 is shifted downwardly to cause engagement of the lower clutch or engagement between claws 42a and lower claws of the member 43. As shown in FIGS. 1 and 5b, the upper gear 41 is meshed with a gear 44 which is rotatably arranged around the cylindrical portion 29a and is secured to the lower head storage magazine 30, whereas the lower gear 42 is operatively connected to the upper head storage magazine 30' through a gear 45 which is fixedly mounted on another rotatably mounted vertical shaft 46 arranged on the axis of the structure 29 and is in constant mesh with the gear 42, the just mentioned another shaft 46, another gear 47 which is fixedly mounted also on such shaft 46, and an internal gear 48 which is secured to the upper magazine 30' and is in constant mesh with the gear 47. It is thus seen that the lower and upper head storage magazines 30 and 30' may selectively be driven to rotate independently from each other in a state where the clamping operation by the magazine clamp means 33 and 33' is released. The angle of rotation of such magazines 30 and 30' may be controlled by controlling the rotation of the motor 37 which may be so-called brake motor having brake means therein. Consequently, any one of the spindle heads $H_2$, $H_3$, $H_4$, $H_1'$, $H_2'$, $H_3'$ and $H_4'$ may be located at a store position just above the mentioned set position by a selective rotation of a head storage magazine 30 or 30' storing such spindle head.

Figure 4:
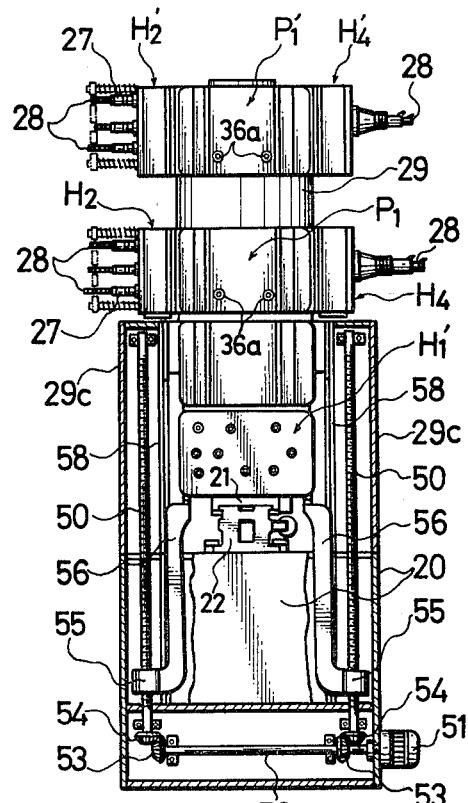
FIG. 4 is a vertical sectional view, partially omitted, taken along line IV—IV of FIG. 1.

As can be seen from FIGS. 1 and 3, the upstanding support frame structure 29 is formed at a side facing the working station S with a pair of vertically extending guide grooves 49 which are aligned with the guide grooves 34 and 34' of the storage rooms P and P' of the head storage magazines which rooms are faced to the working station. Each of the heads H' and H is lifted and lowered between the set position and a store position just above such set position with the ledges 35' and 35 being received by such guide grooves 49 and by the guide grooves 34' and/or 34. For the purpose of lifting and lowering the heads H and H', driving means or vertical conveyor means shown in FIG. 4 is provided. The vertical conveyor means shown comprises a pair of left and right feed screws 50 extending along the vertical direction at within a pair of upstanding hollow extensions 29c which are provided to the support frame structure 29 at both sides of the front portion and at below the lower magazine 30. To a side face of the bed 20 is secured a reversible motor 51 which may rotate in any directions. The feed secrews 50 are operatively connected to such motor 51 at within the bed 20 through a rotatably mounted horizontal shaft 52 connected to the output shaft of the motor 51, a pair of bevel gears 53 fixedly mounted on such shaft 52 and another pair of bevel gears 54 which are fixedly mounted on lower extensions of the feed screws 50 and are in constant mesh with the bevel gears 53. The left and right feed screws 50 are thus driven to rotate synchroneously by the motor 51 selectively into one or another direction. On the feed screws 50 are mounted or threaded a pair of nut means 55 to which a pair of left and right support means 56 are secured so that such support means 56 are lifted and lowered together with the nut means 55 by the rotation of feed screws 50 into one and another directions. The left and right support means 56 extend inwardly and upwardly from the nut means 55 so that the support means 56 support or receive a spindle head H or H' at the bottom of such head. The vertical conveyor means is fashioned such that the support means 56 may be lifted to a lift position, where such support means 56 receive a spindle head H stored at a storage room P of the lower magazine 30 which room is located just above the set position, and further to another lift position where the support means 56 receive a spindle head H' stored at a storage room P' of the upper magazine 30' which room is located just above the set position. It is thus seen that a spindle head H or H' located at the set position may be lifted to a store position or storage room P or P' just above such set position by a selective rotation of the motor 51 which may be a brake motor. And then, another spindle head H or H' which is then located to a store position just above the set position by a rotation of the lower or upper magazine 30 or 30' may be lowered to the set position by rotating the motor 51 into another direction to cause a downward movement of the support means 56. When a spindle head H' is to be lifted and lowered, the lower magazine 30 is rotated previously so that a head storage room P empty of spindle head, namely the room $P_1$, is located just above the set position for providing path of the spindle head H'. Further, each of the head clamp means 36 and 36' is operated after a spindle head H or H' has been lifted to a storage room P or P' provided with such clamp means and each of the head clamp means 36 and 36' is disactuated before a spindle head H or H' clamped by such clamp means is lowered. The mentioned extensions 29c of the structure 29 are formed along the vertical direction with guide grooves 57 for the support means 56 and apertures 58 for permitting the vertical movement of the support means 56, as best seen from FIG. 3.

Figure 6:
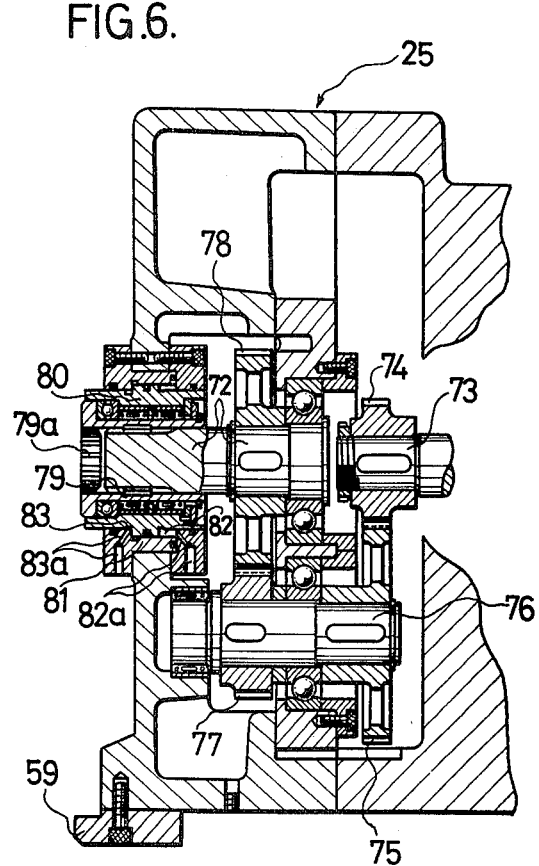
FIG. 6 is an enlarged sectional side view, partially omitted, of a drive unit employed in the machine tool shown in FIG. 1.

Turning to a consideration of FIGS. 6 and 7, there is shown in these figures a setting mechanism for the spindle head so that the head is ready to operate on a workpiece. As shown in FIG. 6, the drive unit 25 is provided at the lower end thereof with stopper means 59 which is forwardly projected so that downward movement of a spindle head H or H' by the vertical conveyor means is limited due to engagement of the bottom of such spindle head to the stopper means 59. Operation of the vertical conveyor or motor 51 is interrupted by a detection of such engagement by means of limit switch means (not shown). The drive unit 25 is further provided with at least one pair of left and right tapered positioning pins 60 one of which is shown in FIG. 7. Each positioning pin 60 is driven to slide between the two positions shown by means of fluid operated cylinder means 61 the piston of which is formed by the pin 60. After a spindle head has been lowered to a position determined by the stopper means 59, the positioning pin 60 is advanced by applying fluid pressure to a fluid chamber 61a through fluid path 62 from the most retreated waiting position shown in phantom to the most advanced position shown at which the pin 60 is inserted at the tapered end thereof into a tapered positioning bore 63a formed by a positioning means 63 fixedly provided to each spindle head. The spindle head which has roughly been positioned by the stopper means 59 is thus positioned precisely with being slightly raised from the stopper means. The pin 60 is retreated to the waiting position by applying fluid pressure to another fluid chamber 61b through fluid path 64 before the spindle head is lifted to a store position.

After such positioning, the spindle head H or H' is clamped to the drive unit 25 by at least one pair of left and right head clamping means one of which is shown in FIG. 7. Each of the head clamping means includes a clamping plate member 65 which is arranged on the front face of the unit 25 at between two rail plates 49a providing the mentioned guide grooves 49. The plate member 65 is mounted on a slide bar 66 having a head 66a of a larger diameter which bar in turn is slidably received by the drive unit 25. On the slide bar 66 is mounted at within the drive unit a piston 67 which is biased by disk shaped spring 68 so as to bias the bar 66 inwardly. Within the drive unit 25 is formed at behind the piston 67 a fluid chamber 69 into which pressure fluid is supplied selectively through fluid path 70 for disactuating the action of spring 68. When fluid is drained from such fluid chamber 69, the clamping plate member 65 is tightly engaged to the mentioned ledges 35 or 35' of the spindle head by the force of spring 68 applied to such plate member through the piston 67, slide bar 66 and the head 66a of such bar, whereby the spindle head is clamped to the drive unit. Such clamping of a spindle head is released by applying fluid pressure to the fluid chamber 69 before such head is lifted to a store position.

A spindle head H or H' clamped to the drive unit 25 by such head clamping means is then operatively connected to the drive unit 25 so that the spindles 27 may be driven to rotate by the mentioned drive motor 26. As shown in FIGS. 6 and 7, each of the spindle heads H and H' comprises a drive shaft 71 having a splined end portion 71a which shaft is constantly connected to the spindles 27 of such head so that the spindles is driven to rotate by a rotation of the drive shaft 71. This drive shaft 71 is aligned to a rotatably mounted shaft 72 provided to the drive unit 25 when the spindle head is located at the set position. The shaft 72 is constantly connected to the spindle drive motor 26, which is omitted in FIGS. 6 and 7, through a rotatable shaft 73 directly connected to such motor 26, a speed-change gearing having gears 74 and 75, another rotatable shaft 76 and another speed-change gearing having gears 77 and 78. On the shaft 72 is slidably but not rotatably mounted at front end portion thereof a hollow cylindrical connecting member 79 having splines 79a at the inner face. On this connecting member 79 is rotatably but not slidably mounted through bearing means a hollow cylindrical piston member 80 having an intermediate portion of larger diameter around which member a cylinder 81 is fixedly arranged. Within the cylinder 81 are formed at behind and before the intermediate portion of the piston member 80 a pair of fluid chambers 82 and 83 into which pressure fluid may be supplied through fluid paths 82a and 83a, respectively. Consequently, the connecting member 79 and piston member 80 are advanced in union when pressure fluid is supplied into the fluid chamber 82, whereas such members 79 and 80 are retreated in union when pressure fluid is supplied into the fluid chamber 83. The conndcting member 79 is projected, when advanced, from the front face of the cylinder 81 to a position shown in FIG. 6 and also shown in phantom in FIG. 7 at which position the hollow cylindrical connecting member 79 having internal splines 79a rides on the splined end portion 71a of the drive shaft 71 resulting in a splined connection of the connecting member 79 to the shaft 71 so that the shaft 71 may be rotated by the shaft 72 through the connecting member 79. It is thus seen that a spindle head H or H' clamped to the drive unit 25 may selectively connected or disconnected by means of fluid operated cylinder means comprising cylinder 81 and piston 80.

As can now be understood with ease, the plurality of spindle heads H and H' may quickly be set alternatively one by one to the set position in front of the drive unit 25 or at the working station S. For exchanging such spindle heads, a spindle head having been employed for processings at the working station S is disconnected from the drive unit by a retreatment of the connecting member 79 which may be caused by a supply of pressure fluid into the fluid chamber 83, clamping of such spindle head by the clamping plate member 65 is released by a supply of pressure fluid into the fluid chamber 69, the positioning pin 60 is retreated by a supply of pressure fluid into the fluid chamber 61b, and then the vertical conveyor means having feed screws 50 is operated so as to lift the spindle head to a store position just above the set position or to a head storage room P or P' at which such head is to be stored. The spindle head is then clamped to a magazine 30 or 30' by draining fluid from the fluid chamber 36c or 36c'. A magazine 30 or 30' carrying a spindle head H or H' which is then to be set at the working station S is rotated, after such magazine has been unclamped by a supply of pressure fluid into the fluid chamber 33c or 33c', by the motor 37 so that the spindle head is located at a store position just above the set position, and then the magazine is again clamped by draining fluid from the chamber 33c or 33c'. After the spindle head has been umclamped by a supply of pressure fluid into the fluid chamber 36c or 36c', the vertical conveyor means having feed screws 50 is operated so as to lower such spindle head to the mentioned set position. The spindle head is then positioned by a supply of pressure fluid into the fluid chamber 61a, is clamped to the drive unit 25 by draining fluid from the fluid chamber 69, and then is operatively connected to the drive unit 25 by a supply of pressure fluid into the fluid chamber 82 so that the spindles 27 of such head may be driven to rotate by the spindle drive motor 26.

Figure 8:
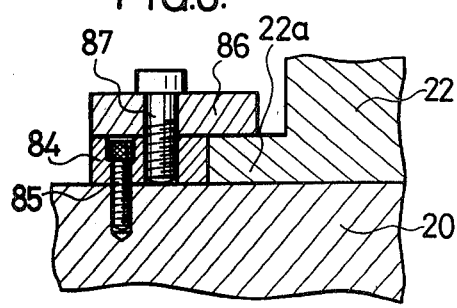
FIG. 8 is an enlarged vertical sectional view showing a part of bed and guide table employed in the machine tool shown in FIG. 1.

A spindle head H or H' which has been set at the working station S will be employed for processing workpieces in the fashion detailed before. In the machine shown, the mentioned guide table 22 is particularly fashioned such that the position thereof on the bed 20 may be adjusted along the direction of sliding of the mentioned slide table 21, as will be detailed hereinafter. As shown in FIG. 8, the guide table 22 is formed at the lower portion thereof with a pair of left and right legs 22a which are slidably engaged to a pair of left and right guide plate means 84. The guide plate means 84 are arranged on the bed 20 and are secured to such bed by bolt means 85. Between the guide plate means 84 and the legs 22a of the guide table 22 are bridged at on such plate means and legs a pair of left and right fixing plate members 86 which are secured to the guide plate means 84 by bolt means 87. The guide table 22 may thus be moved or displaced, by loosening once the bolt means 87, along the direction of sliding of the slide table 21 toward and away from the working station S so that the position of such table 22 may be adjusted. When a series of workpieces which are to be processed successively at the working station S by employing a spindle head are large in size, the guide table 22 is retreated previously to a retreated position at which the tools 28 of such spindle head do not interfere with such workpiece already at the most retreated state of the slide table 21 or drive unit 25 thereon. Conversely, when a series of workpieces which are to be processed successively at the working station S by employing a spindle head are small in size, the guide table 22 may be advanced previously to an advanced position, at which clearance between such workpiece and the tools 28 of such spindle head is not excessively large, for shortening distance of advancing and retreating travel of the slide table 21 or drive unit 25 thereon which travel is made by the mentioned motor 23 at between every processings, that contributes toward a promotion of efficiency of processings. For such adjustment of the position of the guide table 22, there may be provided between the bed 20 and such guide table 22 means for advancing and retreating the table 22 (not shown) which may comprise, by way of example, a feed screw rotatably supported by the bed and rotated by a manually operable handle and nut means secured to the guide table and mounted on such feed screw.

As can be seen from FIGS. 1 and 2, the lower and upper jig storage magazines 230 and 230' on the upstanding support frame structure 229 are fashioned similarly to the lower and upper head storage magazines 30 and 30' on the upstanding support frame structure 29 and are rotatably mounted on the structure 229 in a like fashion as the head storage magazines 30 and 30' on the structure 29. Magazine clamp means for clamping respective jig storage magazines 230 and 230' to the support frame structure 229, jig clamp means for clamping the respective workpiece support jigs J and J' to the magazines 130 and 130', and also drive means for rotating the jig storage magazines 230 and 230' are also fashioned similarly to those arranged on the support frame structure 29, as can also be seen from FIGS. 1 and 2. For avoiding unnecessary repetitions and for simplicity, the parts and members on the upstanding support frame structure 229 which parts and members are similar to or correspond to those on the upstanding support frame structure 29 are designated by reference numerals larger by two hundreds than reference numerals used for designating those on the structure 29 in the drawings and further descriptions will be omitted. For the purpose of lifting and lowering selectively one of the workpiece supporting jigs $J_2$, $J_3$, $J_4$, $J_1'$, $J_2'$, $J_3'$, and $J_4'$ between the set position at the working station S and a storage position or jig storage room Q or Q' just above such set position, there is provided drive means or vertical conveyor means which may be fashioned similarly to the mentioned vertical conveyor means having feed screws 50 for lifting and lowering the spindle heads H and H'. Such vertical conveyor means is omitted from the drawings also for avoiding uncessary repetitions and for simplicity.

Figure 9:
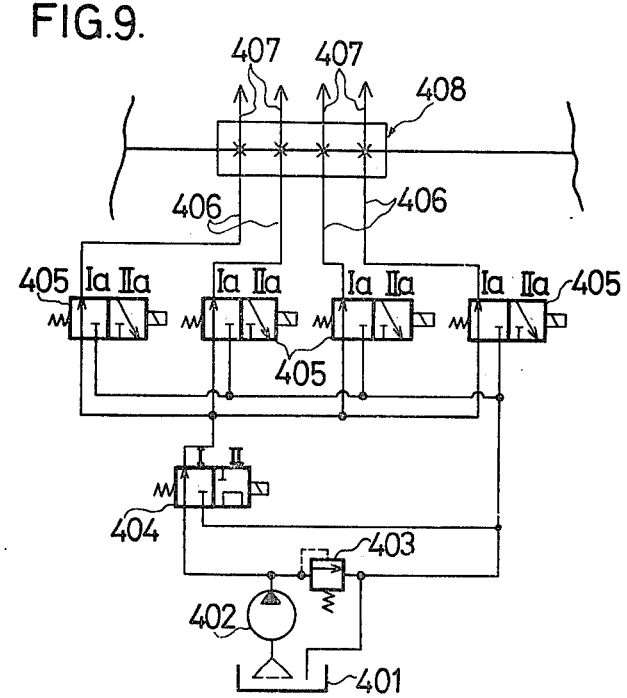
FIG. 9 is a schematic illustration of fluid supply system for workpiece clamping means provided to workpiece supporting jigs employed in the machine tool shown in FIG. 1.
Figure 10:
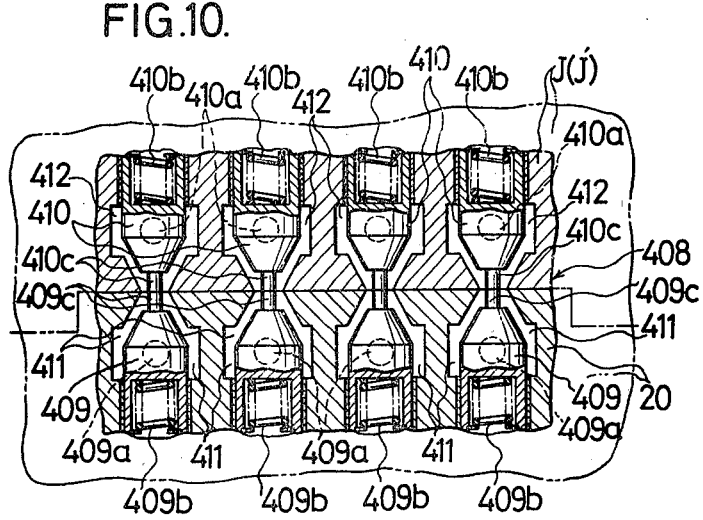
FIG. 10 is an enlarged vertical sectional view of a part of bed and workpiece supporting jig employed in the machine tool shown in FIG. 1, showing fluid path connecting mechanism employed in the fluid supply system shown in FIG. 9.

The mentioned workpiece clamping means 232 provided to each of the jigs J and J' are fashioned as fluid operated clamping means known per se. For actuating such clamping means 232, fluid supply system shown in FIG. 9 is provided. Such system includes a fluid tank 401, fluid pump 402, relief valve 403 for determining or establishing fluid pressure applied to the clamping means 232 or fluid operated cylinder means of such clamping means, electromagnetic change-over valve 404, and a plurality of or four another electromagnetic change-over valves 405. These members 401 to 405 are arranged within the bed 20. From the change-over valves 405 are derived fluid paths 406 which are to be connected to another fluid paths 407 which are provided within each of the jigs J and J' and are constantly connected to respective clamping means 232. As shown in FIG. 9, the change-over valve 404 is connected to the pump 402 and tank 401 and to each of the change-over valves 405 and has a position I, in which the valve 404 permits flow of fluid from the pump 402 toward the change-over valves 405, and another position II in which the valve 404 shuts the valves 405 from the pump 402 and returns fluid from such pump to the tank 401. Each of the change-over valves 405 which are connected to the valve 404 and tank 401 has a position Ia, in which such valve 405 permits flow of fluid from the valve 404 or pump 402 toward fluid path 406 associated therewith, and another position IIa in which such valve 405 permits flow of fluid from fluid path 406 associated therewith toward the tank 401. Between the bed 20 and each of the jigs is arranged a connecting mechanism 408 schematically illustrated in FIG. 9 which mechanism connects automatically the fluid paths 406 in the bed 20 to the fluid paths 407 in the jig when such jig has been lowered to the set position. It is thus seen that all of the fluid operated clamping means 232 of a jig J or J' located at the set position may be actuated and disactuated at a same time by changing the position of the change-over valve 404 and the fluid operated clamping means 232 of such jig may be actuated and disactuated individually by changing the position of respective change-over valves 405. The connecting mechanism 408 is fashioned as shown in FIG. 10. The mechanism 408 includes a plurality of terminal members 409 which are arranged within the bed 20 and are connected respectively to the mentioned fluid paths 406 or change-over valves 405. Such mechanism 408 further includes a plurality of another terminal members 410 which are arranged within each of the jigs J and J' and are connected respectively to the mentioned fluid paths 407 or workpiece clamping means 232 of such jig. The terminal members 409 and 410 are formed with openings 409a and 410a which open at respective void spaces 411 and 412 formed respectively to the bed 20 and each jig at around such terminal members. The openings 409a and 410a are closed by plugs (not shown) each of which is biased to a position closing the opening by a spring 409b or 410b arranged within the terminal member. To such plugs are secured rod members 409c and 410c which are biased to project outwardly by the springs 409b and 410b through the plugs. The rod members 409c and 410c are fashioned such that, when such rod members are pused so as to retreat toward the inside of the terminal members 409 and 410 against the force of springs 409b and 410b, the rod members 409c and 410c move the plugs associated therewith to another position at which the openings 409a and 410a are opened. The void spaces 411 of the bed 20 which space open at the upper face of the bed and void spaces 412 of the jig which space open at the lower face of the jig are fashioned such that respective void spaces 411 are communicated to respective void spaces 412 when the jig has been lowered to the set position. Further, the rod members 409c provided to the bed 20 and the rod members 410c provided to the jig are fashioned such that respective rod members 410c are engaged to the corresponding rod members 409c, when the jig is lowered to the set position, so that they are pushed by one another whereby both of the rod members 409c and 410c are moved to the mentioned another position at which the openings 409a and 410a are opened. Consequently, when a jig J or J' has been lowered to the set position, the mentioned fluid paths 406 are automatically connected to the mentioned fluid paths 407 through the terminal members 409, openings 409a, void spaces 411, void spaces 412, openings 410a and terminal members 410. If required, there may be provided between the upper face of the bed and the lower face of each jig an appropriate sealing means such as mechanical sealing means which prevents leakage of fluid from between the bed and jig after the jig has been set at the set position.

The workpiece supporting jigs $J_2$, $J_3$, $J_4$, $J_1'$, $J_2'$, $J_3'$ and $J_4'$ are alternatively set one by one to the set position at the working station S selectively in accordance with the sort and size of workpiece to be processed in a similar manner as the spindle heads H and H'. At such set position, the jig J or J' supports a workpiece to be processed by a spindle head H or H' by clamping such workpiece by means of the workpiece clamping means 232. If required or preferred, jig positioning means and/or jig clamp means which may be fashioned similarly to the mentioned head positioning means and head clamp means provided to the drive unit 25 are provided to the lower portion of the upstanding support frame structure 229.

The plurality of head storage magazines 30 and 30' each having the plurality of head storage rooms P or P' which magazines are arranged on the upstanding support frame structure 29 along the vertical direction enlarge, without a necessity of large floor space, processings in number which may be carried out at the working station S. Such processings possibly carried out at the working station S are also enlarged in number without a necessity of large floor space by the plurality of jig storage magazines 130 and 130' each having the plurality of jig storage rooms Q or Q' which are arranged along the vertical direction on the upstanding support frame structure 229. Such head storage magazines and/or jig storage magazines mounted on the structure 29 and/or structure 229 may be three or more along the vertical direction of such structure. This requires no additional floor space. As can be understood now, one of the storage rooms of each of the magazines except for the uppermost magazine is empty of spindle head or workpiece supporting jig for providing path of vertical conveying of such head or jig when a plurality of head or jig storage magazines are provided. Number of spindle heads or workpiece supporting jigs stored in such case is thus;

$$(m-1) \times (n-1) + m$$

wherein $m$ is the number of storage rooms formed to each of the storage magazines and $n$ is the number of the storage magazines. The mentioned vertical conveyor means which supports or receives a spindle head or workpiece supporting jig at the bottom of such head or jig in lifting and lowering operation will make it easy to provide such plurality of storage magazines because such conveyor means requires no space at above the upstanding support frame structure so that such space may be utilized for providing additional magazines as it is. As can be understood easily by those skilled in the art, alternative setting of the spindle heads H and H' and also of the workpiece supporting jigs J and J' employed in the machine tool according to the present invention may be carried out under a control by a numerical control device known per se. The heads H and H' and jigs J and J' may, of course, be exchanged simultaneously under such control. In addition, a plurality of tools carried by a spindle head H or H' for applying simultaneously plural processings to a workpiece are set at a same time.

Figure 11:
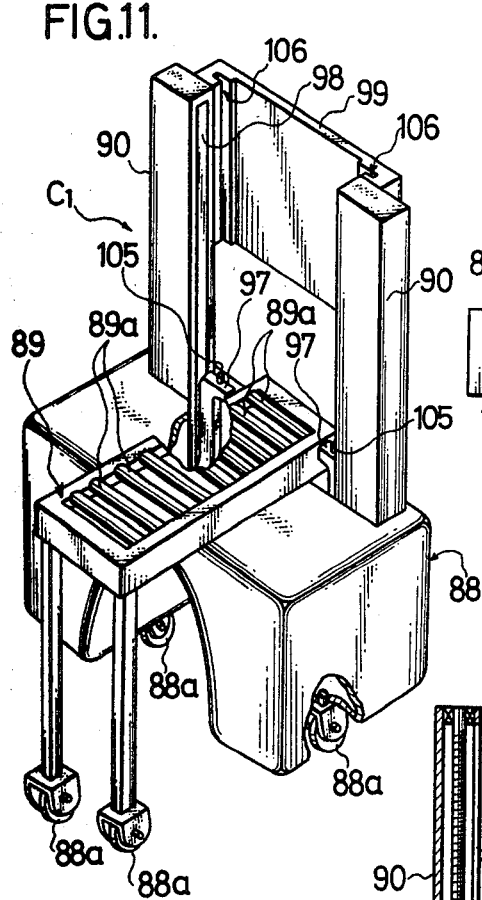
FIG. 11 is a perspective view, partially cut away, of spindle head exchanging device employed in the machine tool shown in FIG. 1.
Figure 12:
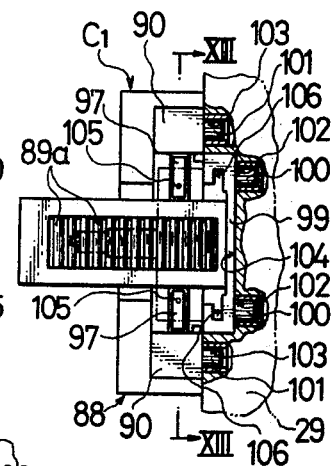
FIG. 12 is a plane view, partially in section, of the spindle head exchanging device shown in FIG. 11 and a part of upstanding support frame structure employed in the machine tool shown in FIG. 1.
Figure 13:
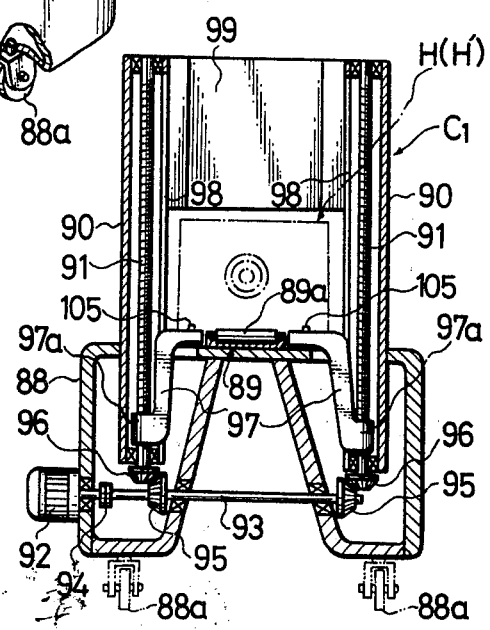
FIG. 13 is a vertical sectional view of the spindle head exchanging device shown in FIGS. 11 and 12 taken along line XIII—XIII of FIG. 12.

For the purpose of enlarging further processings in number which may be carried out at the working station S, the machine tool shown is particularly provided with the mentioned spindle head exchanging device $C_1$ and jig exchanging device $C_2$. Such exchanging devices $C_1$ and $C_2$ are arranged at rear sides of respective upstanding support frame structures 29 and 229, as shown in FIGS. 1 and 2. As shown in FIGS. 11 to 13, the spindle head exchanging device $C_1$ is mounted on a truck means 88 having wheels 88a for travelling. As also shown in FIGS. 11 to 13, the exchanging device $C_1$ comprises a horizontal transfer path means 89 having a plurality of rollers 89a which are rotatably arranged with equal intervals therebetween along the longitudinal or transfer direction of such path means. On the truck means 88 are fixedly mounted a pair of upstanding hollow columns 90 within which a pair of feed screws 91 are rotatably arranged along the vertical direction, as shown in FIG. 13. The exchanging device $C_1$ is provided with a reversible motor 92 which is fixedly arranged on a side wall of the truck means. The feed screws 91 are operatively connected to such motor 92 through a horizontal shaft 93 which is rotatably mounted on the truck means and is connected to the motor 92 or the output shaft thereof by coupling means 94, a pair of bevel gears 95 which are fixedly mounted on the shaft 93, and another pair of bevel gears 96 which are fixedly mounted on the feed screws 91 at the lower ends of such screws and are in constant mesh with the former bevel gears 95. The left and right feed screws 91 may thus be driven to rotate synchroneously by the motor 91. On the left and right feed screws 91 are mounted a pair of left and right support means 97 having nuts 97a at the lower ends thereof by which nuts the support means are threaded on the screws 91. The support means 97 are thus moved along the vertical direction when the feed screws 91 are rotated by the motor 92. The left and right support means 97 extend inwardly and upwardly so that the upper faces of such support means are positioned at a level of the upper face of the transfer path means 89 when the support means 97 are positioned at most lowered position shown. The left and right upstanding columns 90 are formed at opposite walls thereof with apertures 98 extending along the vertical direction for permitting the vertical movement of the support means 97.

As also shown in FIGS. 11 to 13, a guide plate means 99 is bridged between the left and right columns 90 at the upper portion and at the front of such columns. From such guide plate means 99 and also from the truck means 88 are projected forwardly two pairs of positioning pins 100 and 101 which cooperate with two pairs of positioning bores 102 and 103 provided to the rear face of the upstanding support frame structure 29. When the exchanging device $C_1$ on the truck means 88 is set at the rear side of the frame structure 29, the guide plate means 99 are fitted into a receiving groove 104 formed to the rear face of the structure 29 and the positioning pins 100 and 101 are inserted or fitted into the positioning bores 102 and 103 resulting in positioning of the device $C_1$, as shown in FIG. 12. At such set position of the exchanging device $C_1$, the support means 97 are located at a position just below one of the head storage rooms P or P' of each head storage magazine 30 or 30' which room is now located at such rear side or phase. The transfer path means 89 is employed for transferring a spindle head H or H' to and out of such position just below such head storage room of the rear phase, and drive means or vertical conveyor means comprising the motor 92, feed screws 91 and support means 97 is employed for lifting and lowering a spindle head H or H' between such position just below such head storage room of the rear phase and the said head storage room. The support means 97 are provided with limit switch means having movable contacts 105 which are biased to project upwardly from the upper faces of the support means. When a spindle head is transferred from outside to the mentioned position just below each one of the head storage rooms P and P', the contacts 105 are once submerged by the bottom of such spindle head to cause switching-on of the limit switch means and then are projected again when the spindle head has properly been positioned so that the contacts 105 are inserted or fitted into corresponding bores (not shown) formed to the bottom of each spindle head. The limit switch means thus detect a proper transferring-in of such spindle head. The guide plate means 99 is formed with a pair of vertically extending guide grooves 106 which are aligned with the mentioned guide grooves 34 and 34' of the head storage rooms P and P' so that the grooves 106 may receive or support the ledges 35 and 35' of the spindle head H or H'.

The vertical conveyor means employed in the device $C_1$ is fashioned such that the support means 97 may be lifted to a lift position, at which such support means receive a spindle head H carried by the lower magazine 30, and to another lift position in which the support means 97 receive a spindle head H' carried by the upper magazine 30'. Because each of the head storage rooms P and P' or spindle heads H and H' stored at such rooms may be located at the rear side of the frame structure 29 by a selective rotation of the lower or upper head storage magazine by means of the mentioned motor 37, each of the spindle heads H and H' stored by the lower and upper magazines 30 and 30' may selectively lowered onto the transfer path means 89 by using the vertical conveyor means having support means 97 in a manner similar to lowering of a spindle head to the set position at the working station S. Such spindle head lowered onto the transfer path means 89 may then be transferred outwardly along such path means 89. Thereafter, another spindle head may be transferred along the transfer path means 89 to a position just below one of the head storage room from which a spindle head has been removed. Such another spindle head may then be lifted to such head storage room by using the vertical conveyor means and may be stored at such storage room in a manner similar to that detailed before with regard to re-storing of a spindle head from the set position at the working station S. When a spindle head H' stored by the upper head storage magazine 30' is to be exchanged by another spindle head, a head storage room P empty of spindle head H is located previously by a rotation of the lower magazine 30 so that path of vertical conveying of such spindle head H' and such another spindle head is provided by such room P. The spindle head H and H' stored by the magazine 30 and 30' may be exchanged for another spindle head by using this head exchanging device $C_1$ during a processing operation by employing a spindle head having been set at the working station S, that requires no additional time for such exchange.

For the purpose of safety, safety means is provided which permits unclamping operation of the mentioned head clamps means 36 and 36' first when the vertical conveyor means having the support means 97 has reached a level where it receives a spindle head to be exchanged for another spindle head. Fluid supply system for the head clamp means 36 or 36' including such safety means is schematically illustrated in FIG. 14. The supply system comprises a pair of electromagnetic change-over valves 107 and 108 which are inserted in series into fluid supply circuit from a fluid tank 109 via a fluid pump 110 to each of the head clamp means 36 or 36' or fluid chambers 36c or 36c' thereof. The change-over valve 107 has a position Ic, in which fluid from the pump 110 is returned to the tank 109, and another position IIc in which fluid from the pump 110 is forwarded toward the change-over valve 108. The change-over valve 108 has a position Id, in which fluid is drained from the fluid chamber 36c or 36c' of the head clamp means, and another position IId in which fluid supply path from the change-over valve 107 is connected to such fluid chamber 36c or 36c'. The change-over valve 107 is fashioned such that it is displaced automatically from position Ic to position IIc only when the support means 97 has reached the mentioned level of receiving a spindle head H or H' so that such support means engage to a movable contact of limit switch means (not shown) provided at such level resulting in energizing to displace the valve 107. Consequently, the change-over valve 107 is kept at position Ic, before a head H or H' has been received at the bottom thereof by the support means 97, in which position fluid pressure determined by a relief valve 111 shown is not applied to the hand clamp means 36 or 36' even if the change-over valve 108 is displaced into position IId. Clamping of each spindle head may thus be released by displacing the valve 108 into position IId only after such spindle head has been received or supported by the support means 97, that prevents unexpected falling-down of the spindle head due to a careless releasing operation of such clamping so that damages to the machine and a danger to operators which may be caused by such falling-down are avoided. In addition, another means for automatically displacing the position of the change-over valve 107 is provided although not shown in the drawings, which displaces the valve 107 into position IIc only when the support means 56 of the vertical conveyor means provided to the front portion of the frame structure 29 has reached a level where such support means 56 receive a spindle head H or H'. Unexpected fallin-down of a spindle head during a setting operation is thus prevented, too. It is further to be noted that the mentioned clamp means having clamp pins 33a, 33a' and 36a, 36a' which are actuated by the force of spring are not disactuated even when fluid pumps are stopped unexpectedly due to a stoppage of electric power supply or another reason, that also contributes toward safety for the machine itself and for operators.

The jig exchanging device $C_2$ provided at the rear side of the upstanding support frame structure 229 is also mounted on a truck means 288 and is fashioned substantially same as the spindle head exchanging device $C_1$ detailed hereinbefore. Detailed illustration and further description are thus omitted. In FIGS. 1 and 2, parts of such device $C_2$ are designated by reference numeral larger by two hundreds than reference numerals used for designating like parts of the device $C_1$.

It is to be noted that the spindle head exchanging device $C_1$ and the jig exchanging device $C_2$ are provided in a skillful fashion by utilizing the fact that spindle heads and jigs are stored respectively on the rotatably storage magazines arranged on the upstanding support frame structures so that there are required no additional members other than the transfer path means and vertical conveyor means for such devices $C_1$ and $C_2$. The exchanging devices $C_1$ and $C_2$ enlarge very much processings possibly carried out at the working station S, as can now be understood. Mounting of such devices $C_1$ and $C_2$ on truck means 88 and 288 not only permits a removal of the devices from the machine tool but makes such devices common to a plurality of machine tools which are provided to, for example, a transfer machine.

When a plurality of head storage magazines or a plurality of jig storage magazines are provided on an upstanding support frame structure along the vertical direction, two kinds of or first and second vertical conveyor means may be provided for alternatively setting spindle heads or workpiece supporting jigs stored to such storage magazines. The first vertical conveyor means is employed for lifting and lowering one of the spindle heads or jigs selectively between vertically aligned two storage rooms of a predetermined specific phase of the lowermost magazine and a magazine arranged at above the lowermost magazine, whereas the second vertical conveyor means is employed for lifting and lowering one of the spindle heads or jigs selectively between the set position at the working station and a storage room of the lowermost magazine which room is located just above such set position. In a variation shown in FIG. 15, each of the spindle heads $H_1'$, $H_2'$, $H_3'$ and $H_4'$ stored by the upper head storage magazine 30' is selectively lifted and lowered at the rear side or phase of the upstanding support frame structure 29 between a head room $P_3$ of the lower head storage magazine 30, which room is empty of spindle head, and a head storage room P' storing such head H' which room has been located to such rear side or phase prior to such lifting and lowering by a selective rotation of the upper magazine 30'. For such selective lifting and lowering of a spindle head H' between the lower and upper magazines 30 and 30', a first vertical conveyor means (not shown) is employed. A spindle head H' once stored by the lower magazine 30 may be displaced between the rear side or phase and front side or phase of the frame structure 29 by a selective rotation of the lower magazine 30. One of the spindle heads H and H' is selectively lifted and lowered at the front side or phase of the structure 29 between the set position, to which a spindle head $H_1$ is now lowered, and a storage room P of the lower magazine 30. For this latter lifting and lowering of a spindle head H or H', a second vertical conveyor means is employed. The second vertical conveyor means may be fashioned in a similar manner as the mentioned conveyor means having support means 56 shown in FIG. 4. Stroke of such second vertical conveyor means may, however, be such that is only enough to lift and lower a spindle head between the set position at the working station S and the lower magazine 30. The first vertical conveyor means may be fashioned similarly to the mentioned vertical conveyor means having support means 97 employed in the head exchanging device $C_1$ and shown in FIG. 13. When the head exchanging device $C_1$ or another head exchanging device similar thereto is provided, such first vertical conveyor means may be omitted because a spindle head H' may be lifted and lowered between the lower and upper magazines 30 and 30' by using vertical conveyor means employed in such head exchanging device. The mentioned vertical conveyor means shown in FIG. 4 corresponds to the second vertical conveyor means which holds the first vertical conveyor means.

Turning to a consideration of FIGS. 16 to 20, there is shown in these figures another preferred embodiment of the machine tool according to the present invention. In the machine tool of this embodiment, there is provided at the left side of the working station S a storing and setting mechanism for spindle heads H and H' similar to that employed in the machine tool shown in FIGS. 1 to 14, as shown in FIG. 16. On an upstanding support frame structure 229 installed at the right side of the working station S is rotatably mounted only one jig storage magazine 230 by which a plurality of four workpiece supporting jigs $J_1$, $J_2$, $J_3$ and $J_4$ are stored at jig storage rooms $Q_1$, $Q_2$, $Q_3$ and $Q_4$ formed to such magazine 230 at the periphery thereof and intermittently along the peripheral direction thereof. These jigs J are lifted and lowered between the set position at the working station S and a store position or jig storage room Q just above such set position by means of drive means or vertical conveyor means having vertically movable chuck means 415. On the upper face of the frame structure 229 is fixedly arranged a housing 416 having forwardly projected guide and support means 416a by which the chuck means 415 is supported slidably along the vertical direction. The chuck means 415 is driven to move upwardly and downwardly by motor means (not shown) provided within the housing 416. On the top end of each of the L-letter shaped jigs J, each having a pair of upwardly projected portions at both sides, are fixedly provided a pair of left and right projections 417 which may be caught by a pair of left and right chucks 415a provided to the lower end of the chuck means 415. The chucks 415a are actuated and disactuated by hydraulic, electric or mechanical operating means (not shown) provided within the housing 415 which operating means may be structured in any of the known fashions. Each of the jigs J may thus be lifted and lowered by catching such jig at the projections 417 by means of the chucks 415a and by lifting and lowering the chuck means 415. Although there are omitted from the drawings magazine clamp means for clamping the magazine 230 to the frame structure 229, jig clamp means for clamping respective jigs to the magazine 230 and drive means for rotating the magazine 230, it is to be understood that they may be structured in a fashion similar to those provided to the machine tool shown in FIGS. 1 to 14.

In the machine tool shown in FIGS. 16 to 20, there is particularly provided on the bed 20 and at the working station S a jig supporting table means D onto which each of the jigs J is lowered. This table means D is employed for indexing a workpiece W together with a jig J which supports such workpiece W thereon. Such table means D is illustrated in details in FIGS. 17 to 20.

Figure 17:
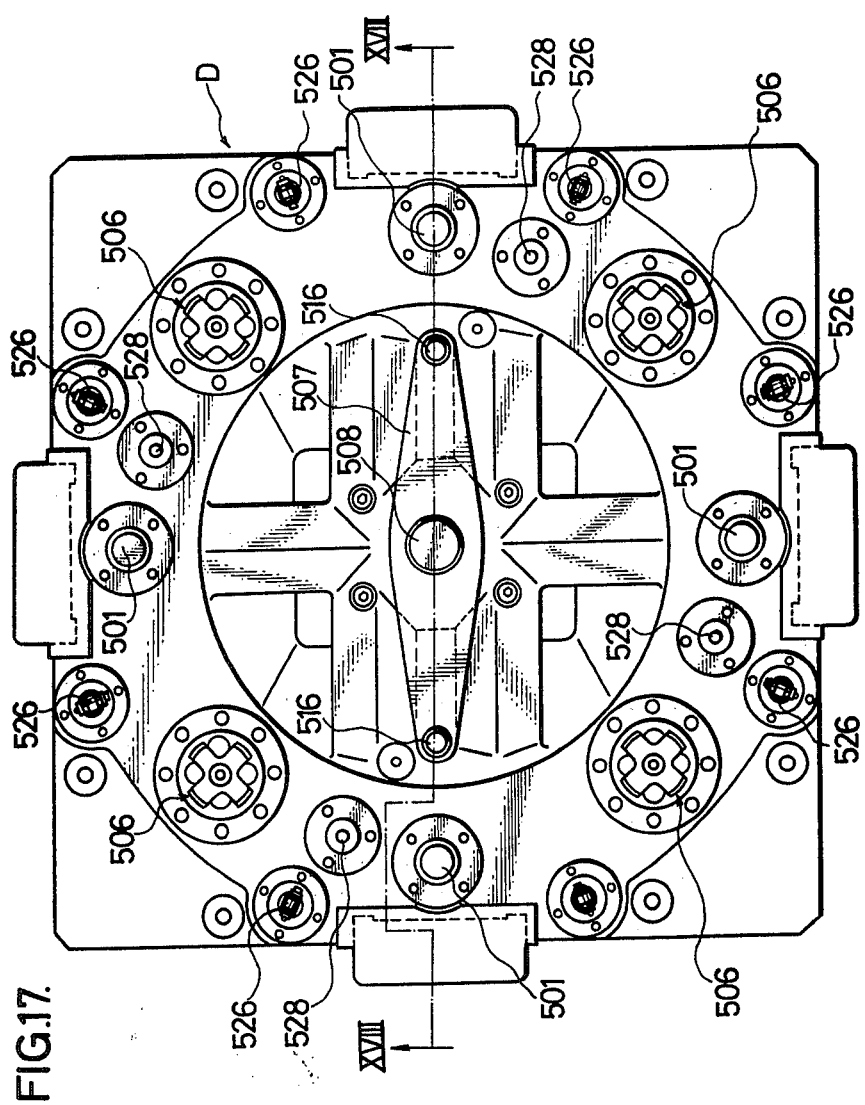
FIG. 17 is an enlarged plane view of jig supporting table means employed in the machine tool shown in FIG. 16.

In general, the jig supporting table means D has a flat upper face. As shown in FIGS. 17 and 18, the table means D comprises a plurality of vertically extending positioning pins 501 which are arranged intermittently along the circular direction. Each of the positioning pins 501 is slidably supported by the table D and is driven to slide by fluid operated cylinder means 502 arranged within the table. Such cylinder means 502 comprises a piston 501a formed by the lower end portion of the pin 501 which piston defines a lower and upper fluid chamber 502a and 502b at within the cylinder means. When pressure fluid is supplied into the lower fluid chamber 502a, the positioning pin 501 is projected upwardly to a lift position from the upper face of the table means D. At such lift position, each of the positioning pins 501 is fitted into positioning bore 503 formed to the bottom of the jig J by means of bush 503a fixedly secured to such jig, as shown in FIG. 18, so that the jig J is positioned properly with regard to position or posture along the circular direction. When pressure fluid is supplied into the upper fluid chamber 502b, the positioning pin 501 is lowered resulting in disengagement with the jig. A pair of limit switch means 504 and 505 are provided which detect respectively such positioning and disengaging. As shown in FIG. 17, the table means D further comprises a plurality of clamp means 506 which are arranged intermittently along the circular direction. Each of the clamp means 506 is fashioned such that it is lifted from the upper face of the table by an appropriate lifting means (not shown) to a lift position and is rotated by an angle of, for example, 45° at such lift position by an appropriate rotating means (not shown) to cause clamping of the jig J. The clamp means 506 and lifting means and rotating means for such clamp means 506 may be structured in any of the known fashions.

The table means D is particularly provided with a horizontal indexing arm means 507 which is employed for indexing the workpiece W together with a jig J which supports such workpiece. This horizontal arm means 507 is arranged at the center portion of the upper face of the table. Such arm means 507 is fixedly mounted on a rotatably mounted vertical shaft 508 arranged on the vertical axis of the table D, as shown in FIGS. 17 to 20. As shown in FIG. 19, the shaft 508 is rotatably supported through bearings 509, 510 and 511 by a piston means 512 which is arranged at around the shaft 508 and is supported slidably along the vertical direction by the table D and bed 20. On the shaft 508 is fixedly mounted at the lower end portion of such shaft a pinion gear 513. To the lower end of the shaft 508 is secured a fixing disk member 514 by which the bearings 509–511, pinion gear 513 and piston means 512 are sandwiched at between the arm means 507 and such disk member 514 so that they may be moved to slide in union along the vertical direction together with the shaft 508. The piston means 512 has an intermediate portion 512a having an enlarged diameter. Fluid operated cylinder means 515 is provided which has a lower and upper fluid chambers 515a and 515b at below and above such intermediate portion 512a of the piston means. Consequently, the vertical shaft 508 is moved upwardly in union with the bearings 509–511, piston means 512 and pinion gear 513 when pressure fluid is supplied into the lower fluid chamber 515a so as to cause an upward movement of the piston means 512, whereas the vertical shaft 508 is moved downwardly in union with the bearings 509–511, piston means 512 and pinion gear 513 when pressure fluid is supplied into the upper fluid chamber 515b. By such movement of the shaft 508, the horizontal arm means 507 is lifted and lowered between two positions shown in FIG. 18. The arm means 507 has at the both ends thereof a pair of engaging pins 516 which are projected upwardly. When the arm means 507 has been lifted from the lowered position shown in phantom in FIG. 18 to the lift position shown in also FIG. 18, the engaging pins 516 are fitted into engaging bores 517 formed to the bottom of the jig J by means of bushes 517a fixedly secured to such jig so that the jig J is connected not rotatably to the arm means 507.

Within the bed 20 is slidably arranged a pair of horizontally extending racks 518 which are meshed with the pinion gear 513 from the left and right, as shown in FIGS. 19 and 20. As shown in FIG. 20, the racks 518 are mounted on a pair of slide bars 519 so that the racks 518 are moved to slide together with the slide bars 519. The slide bars 519 have thereon pistons 520 before which fluid chambers 521 are formed. One of the slide bars 519 is forcedly driven to slide selectively by fluid pressure applied to one of the fluid chambers 521 so that one of the racks 518 is forcedly retreated selectively. Another rack 518, and therefore another slide bar 519, is moved to slide into another direction by the former rack through the pinion gear 513. The pinion gear 513, and therefore the shaft 508, may be driven to rotate into one and another directions by such selective driving of the racks 518. The horizontal indexing arm means 507 may thus be driven to rotate around the shaft 508 into one and another directions. At the stroke end of each slide bar 519 is provided limit switch means 522 which detects such stroke end by an engagement of the slide bar to a movable contact 522a of such switch means 522. By a detection of such stroke end, driving of the slide bar 519 is stopped. The stroke of each slide bar 519 or rack 518 may be varied by varying the length of such slide bar 519. For this, each of the slide bars 519 is divided into two or front and rear parts 519a and 519b, as shown in FIG. 20 with regard to one of the bars. The rear part 519b has two front end faces Fb and Fb' to which a rear end face Fa of the front part 519a is selectively engaged. Selective engagement of one of the front end faces Fb and Fb' of the rear part 519b to the end face Fa of the front part 519a may be achieved by manually displacing the rear part 519b along and around such part 519b by means of handling means (not shown) secured to the rear end of the rear part 519b. When the front end face Fb' of the rear part 519b is engaged to the rear end face Fa of the front part 519a, the piston 520 is displaced into another position fronter than the position shown so that stroke of the slide bar 519 is shortened. By such adjustment of the stroke of each slide bar 519, the angle of rotation of the shaft 508, and therefore of the arm means 507, may be varied or adjusted to 90° and 180°. In FIG. 20, numeral 523 designates detent means for restraining the rear part 519b of the slide bar 519 selectively at one of two kinds of rotation positions after such adjustment, and numerals 524 and 525 designate respectively means for preventing rotation of the slide bars 519 while permitting sliding movement of such bars which means may be structured in any of the known fashions.

As shown in FIG. 17, the table means D is further provided at the upper face thereof and intermittently along the circular direction with a plurality of guide rollers 526, which cooperate with annular guide rails 527 (FIG. 18) secured to the bottom of the jig J, and a plurality of limit switch means 528 which detect a relative position or posture of the jig J along the circular direction.

The novel jig supporting table means D operates as follows: After a jig J has been lowered selectively on-to the table means D from the jig storage magazine 230, a workpiece is transferred to the working station S and is supported by such jig J by clamping such workpiece by means of workpiece clamping means provided to the jig. Such clamping means are omitted from FIG. 17 but it should be understood that there may be provided any of the known workpiece clamping means which clamp a workpiece on the jig, for example, at the lower end portion of such workpiece. When a side face of such workpiece to which face processing is to be applied by a spindle head $H_1'$, which is now set at the set position thereof, is faced to such spindle head, the jig J is then positioned by projecting the positioning pins 501 so that the position of such jig relative to the circular direction is properly established. The clamp means 506 are then lifted and rotated by an angle so that the jig J is clamped to the table means D. The workpiece W on the jig J is now ready to be processed and is then processed by the spindle head $H_1'$. After such processing, the workpiece W is indexed together with jig J for a processing to be applied to another side face of such workpiece. Before such indexing, the clamp means 506 are rotated into opposite direction so as unclamp the jig J and are lowered to a position in which such clamp means 506 do not prevent a rotation of the jig J together with the horizontal indexing arm means 507. The positioning pins 501 are also lowered by the cylinder means 502 to a position in which such pins 501 do not prevent also such rotation of the jig J together with the arm means 507. Now, there are no obstacles against a rotation of the jig J together with the workpiece W thereon at above the upper face of the table D. The vertical shaft 508 is then lifted by the cylinder means 515 so that the arm means 507 is lifted from the position shown in phantom in FIG. 18 to the position shown in FIGS. 18 and 19 in which such arm means 507 is engaged to the jig J through engaging pins 516 and engaging bores 517. The arm means 507 is then rotated into one or another direction by an angle of rotation of 90° or 180° by a rotation of the vertical shaft 508 which rotation is caused by a supply of pressure fluid into one of the fluid chambers 521. The jig J is thus rotated around the axis of the shaft 508 by 90° or 180° with being guided by the rollers 526 and rails 527. Another side face of the workpiece W which face is to be processed next by the spindle head $H_1'$ is now faced to such spindle head. The indexing arm means 507 is then lowered to the position shown in phantom in FIG. 18 by the cylinder means 515. The jig J is then positioned again by lifting the positioning pins 501 and is clamped again by a lift and rotation of the clamp means 506 for the next processing by means of the spindle head $H_1'$. By repeating such indexing, two, three or four faces of the workpiece W may be applied by processings.

When a side face of the workpiece to which face processing is to be applied by the spindle head $H_1'$ is not faced to such spindle head after the jig J has been lowered and the workpiece has been supported by such jig, an indexing operation may be carried out first. The jig supporting table means D having indexing mechanism therein permits the setting of a workpiece supporting jig from the upside without trouble even when such jig is stored by the magazine 230 for making easy the storing of such jig so that, when the jig is lowered, it supports a workpiece in a direction that a face to be processed is not faced to a spindle head. In addition, such table means D shortens required period of time for indexing a workpiece for applying processings to plural faces of such workpiece so that the table means D promotes efficiency of processings as a whole in cooperation with the novel jig storing and setting mechanism according to the present invention.

In the machine tool shown to FIG. 16, drive unit 25 and spindle drive motor 26 thereof are largely sized so that the motor 26 extends rearwardly from the upstanding support frame structure 29. A spindle head exchanging device (not shown) similar to that shown in FIGS. 11 to 13 may also be provided to the machine tool shown in FIG. 16 by arranging such exchanging device at a side of the structure 29 other than the front and rear sides of such structure 29.

Turning to a consideration of a still another embodiment of the machine tool according to the present invention shown in FIG. 21, there are provided at opposite sides of a working station S a pair of upstanding support frame structures 29. On each of the frame structures 29 are rotatably mounted lower and upper head storage magazines 30 and 30' having head storage rooms P and P'. A plurality of spindle heads H and H' are stored by the magazine 30 and 30' on one of the structures 29 and another plurality of spindle heads H and H' are stored by the magazines 30 and 30' on another frame structure 29 so that a pair of spindle heads may be set alternatively at opposite sides of the working station S at a same time. The left half and also the right half of the machine shown in FIG. 21 have a structure substantially same as that of the left half of the machine shown in FIGS. 1 and 2. This arrangement is advantageous when opposite faces of a workpiece are to be applied by processings at the working station, because setting of a pair of spindle heads employed for such processing and also such processings may respectively be achieved at a time. To this machine tool shown in FIG. 21 is also provided at the working station S thereof a supporting table means D which may have a structure substantially same as that of the table means D shown in FIGS. 17 to 20. Such table means D enhances required indexing of a workpiece carried by a workpiece supporting pallet (not shown) together with such pallet when processings of opposite faces of such workpiece are to be followed by processings of another opposite faces of the workpiece. In addition, such supporting table means D further permits a transferring of a pallet carrying a workpiece into the working station S from any directions because the table means has a substantially flat upper face from which the positioning pins 501, clamp means 506 and also horizontal indexing arm means 507 may be retreated downwardly for permitting such transferring-in of the pallet.

As shown in FIG. 21, a spindle head exchanging device $C_1$ which has a structure same as that of the device $C_1$ shown in FIGS. 11 to 13 is provided. This exchanging device $C_1$ is also mounted on a truck means 88 and may be employed for exchanging spindle heads not only on the left structure 29 but on the right structure 29.

Exchangeable machine members stored in an alternatively settable manner according to the present invention may be tool supporting heads having tool supporting means which cooperate with tools for precise or fine processings. In FIG. 22, an example of the use of the machine tools according to the present invention in a transfer machine is shown in combination with the employment of such tool supporting means. This FIG. 22 shows a part of a transfer machine having a plurality of working stations intermittently along a transfer line L among which stations only three stations $S_1$, $S_2$ and $S_3$ are shown. At both sides of each of such working stations $S_1$-$S_3$ are provided upstanding support frame structures 29 on which lower and upper storage magazines 30 and 30' are rotatably mounted. These magazines 30 and 30' generally store spindle heads H and H'. But, one of the magazines 30' on the frame structure 29 at one side of the working station $S_2$ stores at one of the storage rooms $P_1'$ thereof a tail spindle head $TH_1$ having a slidable tube 150 and a center 151 and one of the magazines 30' on the frame structure 29 at one side of the working station $S_3$ stores at one of the storage rooms $P_1'$ thereof a head $TH_2$ having a boring bar support tube 152. As shown in FIG. 23, the tail spindle head $TH_1$ cooperates with a spindle head $H_1'$ having a boring bar 28a which head is stored by one of the magazines 30' on the frame structure 29 at another side of the working station $S_2$. As is usual, the center 151 projected from the slidable tube 150 supports the boring bar 28a of such spindle head $H_1'$ during a boring process by the spindle head $H_1'$ or such bar 28a, as shown in FIG. 23. At the set position, the tail spindle head $TH_1$ is connected not to the drive unit 25 but to a pressure fluid supply source. For such connection, connecting means similar to that shown in FIG. 10 may be provided. As shown in FIG. 24, the head $TH_2$ cooperates with a spindle head $H_1'$ having a boring bar 28b which head is stored by one of the magazines 30' on the frame structure 30' at another side of the working station $S_3$. As is also usual, the boring bar support tube 152 supports the boring bar 28b of the spindle head $H_1'$ during a boring process by such spindle head or such boring bar 28b in a manner shown in FIG. 24.

Employment or use of the machine tool according to the present invention in a transfer machine may, of course, greatly promotes, as a whole, efficiency of processings, which are applied to various workpieces of various sizes in such transfer machine, and also permits to shorten the transfer line L.

If required, a plurality of tool supporting heads such as the heads $TH_1$ and $TH_2$ shown in FIGS. 22 to 24 may be stored by the magazines on an upstanding support frame structure. As is obvious to those skilled in the art, the mentioned drive means or vertical conveyor means for lifting and lowering spindle heads, workpiece supporting jigs or tool supporting heads may be altered or modified into such that comprises upstanding fluid operated cylinder means, rack and pinion means, or endless chain means. Further, an upstanding support frame structure mounting storage magazines for storing spindle heads or workpiece supporting jigs may be provided only at a side of working station. The present invention is thus not limited to the particular embodiments shown.

We claim:

1. A machine tool comprising:
   (a) a bed having a working station;
   (b) a slide table which is mounted at a side of the working station on said bed by guide means and which is slidable toward and away from the working station, and motor means for sliding the slide table;
   (c) a drive unit having spindle driving motor mounted on said slide table and facing the working station so that the unit is moved toward and away from the working station together with said slide table;
   (d) an upstanding support frame structure which is installed on said bed so that the structure extends above said drive unit;
   (e) a plurality of head storage magazines which are mounted on said support frame structure along the vertical direction so that the magazines may be rotated around a vertical axis, each of said magazines having a plurality of head storage rooms provided intermittently along the periphery thereof;
   (f) magazine clamping means for selectively clamping said respective magazines to said support frame structure;
   (g) selectively operable head clamping means which are provided to said head storage rooms, respectively;
   (h) a plurality of spindle heads having at least one spindle and tool connecting to such spindle which heads are stored one by one at said head storage rooms of the magazines by clamping such heads by means of said head clamping means, one of the head storage rooms of each of the magazines except for the uppermost magazine being empty of the spindle head for providing a path for the spindle heads;
   (i) a drive means for rotating each of said magazines when the magazine is not clamped by said magazine clamping means, the driving means being operatively connected to each of the magazines through clutch means permitting selectively an independent rotation of each of the magazines;
   (j) a first vertical conveyor means for lifting and lowering one of said spindle heads selectively between vertically aligned two storage rooms of a predetermined specific phase of the lowermost magazine and a magazine arranged at above the lowermost magazine;
   (k) a second vertical conveyor means for lifting and lowering one of said spindle heads selectively between a position in front of said drive unit and a storage room of the lowermost magazine which room is located just above such position;
   (l) another head clamping means for clamping the spindle head located in front of said drive unit selectively to such drive unit; and
   (m) connecting means which connects selectively the spindle head clamped by means of said another head clamping means operatively to said drive unit so that the spindle is driven to rotate by said spindle driving motor.

2. The machine tool as claimed in claim 1, characterized in that said second vertical conveyor means is fashioned such that it may lift and lower one of said spindle heads selectively between a position in front of said drive unit and a storage room of an optional one of said magazines, whereby said second vertical conveyor means holds said first vertical conveyor means.

3. The machine tool as claimed in claim 2, characterized in that said second vertical conveyor means is fashioned such that it supports the spindle head at the bottom of such head in lifting and lowering operation thereof.

4. The machine tool as claimed in claim 1, characterized in that said guide means for the drive unit is mounted on the bed so that the position of such guide means may be adjusted along the direction of sliding of said slide table.

5. The machine tool as claimed in claim 1, characterized in that there is provided at the working station and on the bed a support table for workpiece supporting means, which table comprises:
   (a) positioning means which is driven to project from the upper face of the support table for positioning the workpiece supporting means,
   (b) clamp means which is projected selectively toward the workpiece supporting means for clamping such workpiece supporting means at a projected position, and
   (c) horizontal indexing arm means which is driven selectively to move to a lift position where the arm means is engaged not rotatably to the workpiece supporting means and which is driven at such lift position to rotate by a selected angle of rotation together with the workpiece supporting means for indexing a workpiece on the supporting means.

6. The machine tool as claimed in claim 1, characterized in that there is provided at one side of said upstanding support frame structure other than the side facing to the working station a spindle head exchanging device which comprises transfer path means for transferring a spindle head between a position just below one of the storage rooms of said head storage magazines and another position located at outside such position and drive means for lifting and lowering such spindle head between the former position and the said storage room.

7. A machine tool comprising:
   (a) a bed having a working station;
   (b) a slide table which is mounted at a side of the working station on said bed by guide means and which is slidable toward and away from the working station, and motor means for sliding the slide table;
   (c) a drive unit having spindle driving motor mounted on said slide table and facing the working station so that the drive unit is moved toward and away from the working station together with said slide table;

(d) an upstanding support frame which is mounted on said bed so that the structure extends above said drive unit;

(e) at least one head storage magazine rotatably mounted on said support frame for rotation around a vertical axis, said magazine having a plurality of head storage rooms provided intermittently along the periphery thereof;

(f) magazine clamping means for selectively clamping said magazine to said support frame structure;

(g) selectively operable head clamping means which are provided to said head storage rooms;

(h) a plurality of spindle heads each having a plurality of spindles and tools connected to said spindles, the heads being stored at said head storage rooms of the magazine by clamping the heads by said head clamping means;

(i) drive means for rotating said magazine when the magazine is not clamped by said magazine clamping means;

(j) vertical conveyor means for lifting and lowering one of said spindle heads selectively between a position in front of said drive unit and a head storage room of said magazine, which room is located just above such position, said vertical conveyor means being arranged to support the underside of the spindle head during lifting and lowering thereof;

(k) second head clamping means for clamping the spindle head located in front of said drive unit selectively to the drive unit; and (l) connecting means for connecting the spindle head clamped by said second head clamping means to said drive unit so that the spindle is rotated by said drive unit.

8. The machine tool of claim 7 characterized in that there are provided a plurality of said head storage magazines along the vertical direction of said upstanding support frame, said drive means for rotating the magazine being operatively connected to the plurality of magazines through clutch means for selectively rotating each of the magazines independently of the other magazines, said vertical conveyor means being structured such that it lifts and lowers one of the spindle heads selectively between a position in front of said drive unit and a head storage room of each of the magazines.

9. The machine tool of claim 7 including means for mounting said guide means of the drive unit on the bed so that the position of the guide means may be adjusted along the direction of sliding of said slide table.

10. The machine tool of claim 7 including a head exchanging device on a side of said upstanding support frame other than the side facing the working station, said head exchanging device comprising a first transfer path means for transferring a spindle head between a first position just below one of the head storage rooms of said head storage magazine and a second position located at outside the first position, a second transfer path means for transferring a spindle head between the said first position and the said one of the head storage rooms, said second transfer path means having guide means which receives a spindle head at both sides of such head, and another vertical conveyor means for lifting and lowering a spindle head along said second transfer path means.

11. The machine tool of claim 10 characterized in that a spindle head is supported during lifting and lowering thereof by said vertical conveyor means of the head exchanging device.

12. The machine tool of claim 11 including safety means for permitting unclamping operation of said head clamping means first when said vertical conveyor means of the head exchanging device has reached a level where the said conveyor means receives the underside of a spindle head stored at a head storage room of the head storage magazine.

13. The machine tool of claim 11 characterized in that said head exchanging device is mounted on truck means.

14. The machine tool of claim 7, which further comprises:

(a) a second upstanding support frame installed on said bed at the opposite side of the working station;

(b) at least one jig storage magazine rotatably mounted on said second support frame for rotation about a vertical axis, said jig storage magazine having a plurality of jig storage rooms provided intermittently along the periphery thereof;

(c) a second magazine clamping means for selectively clamping said jig storage magazine to said second support frame;

(d) selectively operable jig clamping means which are provided to said jig storage rooms of the jig storage magazine;

(e) a plurality of workpiece supporting jigs having workpiece clamping means, said jigs being stored at said jig storage rooms of the jig storage magazine by clamping the jigs by said jig clamping means;

(f) a second drive means for rotating said jig storage magazine when the magazine is not clamped by said magazine clamping means; and (g) a second vertical conveyor means for lifting and lowering one of said jigs selectively between a set position of such jig at said working station and a jig storage room of the jig storage magazine located just above such set position.

15. The machine tool of claim 14 characterized in that there are provided a plurality of said jig storage magazines along vertical direction of said second upstanding support frame, said second drive means for rotating the jig storage magazine being operatively connected to said plurality of jig storage magazines through clutch means for selectively rotating each of the jig storage magazines independently of the other jig storage magazines, said second vertical conveyor means being structured such that it lifts and lowers one of the workpiece supporting jigs selectively between said set position at the working station and a jig storage room of each of the jig storage magazines.

16. The machine tool as claimed in claim 14 characterized in that said supporting jig is supported during lifting and lowering thereof by said second vertical conveyor means.

17. The machine tool of claim 14 including a jig exchanging device on a side of said second upstanding support frame structure other than the side facing the working station, said jig exchanging device comprising a first transfer path means for transferring a workpiece supporting jig between a first position just below one of the jig storage rooms of said jig storage magazine and a second position located at outside the first position, a second transfer path means for transferring a workpiece supporting jig between the said first position and the said one of the jig storage rooms, the second transfer path means having guide means which receives a workpiece supporting jig at both sides of such jig, and a further vertical conveyor means for lifting and lowering a workpiece supporting jig along said second transfer path means.

18. The machine tool of claim 7 including a support table device at the working station and on the bed, workpiece supporting means on the support table, the support table having a substantially flat upper face, positioning means projecting from the upper face of said support table for positioning the workpiece supporting means, clamp means projecting selectively toward the workpiece supporting means for clamping said workpiece supporting means at a projected position, horizontal indexing arm means movable to a lift position in which the indexing arm means is non-rotatably engaged with the workpiece supporting means, and means for rotating said indexing arm means at said lift position through selected angle of rotation together with the workpiece supporting means for indexing a workpiece on the support means.

* * * * *

UNITED STATES PATENT AND TRADEMARK OFFICE
CERTIFICATE OF CORRECTION

PATENT NO. : 4,110,898

DATED : September 5, 1978

INVENTOR(S) : Kojiro Yamaoka et al

It is certified that error appears in the above-identified patent and that said Letters Patent are hereby corrected as shown below:

In column 25, line 46, "connecting" should be --connected--.

Signed and Sealed this

Third Day of July 1979

[SEAL]

Attest:

LUTRELLE F. PARKER

Attesting Officer     Acting Commissioner of Patents and Trademarks